(12) United States Patent
Niemeyer et al.

(10) Patent No.: US 11,149,950 B2
(45) Date of Patent: Oct. 19, 2021

(54) PRE-SWIRL PRESSURE ATOMIZING TIP

(71) Applicants: Sander G. Niemeyer, Grand Rapids, MI (US); Deke R. Pyle, Zeeland, MI (US)

(72) Inventors: Sander G. Niemeyer, Grand Rapids, MI (US); Deke R. Pyle, Zeeland, MI (US)

(73) Assignee: Woodward, Inc., Fort Collins, CO (US)

( * ) Notice: Subject to any disclaimer, the term of this patent is extended or adjusted under 35 U.S.C. 154(b) by 338 days.

(21) Appl. No.: 16/005,371

(22) Filed: Jun. 11, 2018

(65) Prior Publication Data

US 2019/0376690 A1 Dec. 12, 2019

(51) Int. Cl.
| F23R 3/14 | (2006.01) |
| F23R 3/28 | (2006.01) |
| B33Y 80/00 | (2015.01) |

(52) U.S. Cl.
CPC .............. *F23R 3/14* (2013.01); *F23R 3/283* (2013.01); *F23R 3/286* (2013.01); *B33Y 80/00* (2014.12); *F23R 2900/00018* (2013.01)

(58) Field of Classification Search
CPC .... B05B 1/3442; B65D 83/753; B65D 83/28; B65D 83/62; B65D 83/32
USPC .................... 239/463, 461, 214.21
See application file for complete search history.

(56) References Cited

U.S. PATENT DOCUMENTS

| 1,461,545 | A | * | 7/1923 | Purnell | ................. | B05B 1/3436 |
| | | | | | | 239/462 |
| 2,904,263 | A | * | 9/1959 | Tate | ...................... | B05B 1/3436 |
| | | | | | | 239/494 |
| 4,260,110 | A | * | 4/1981 | Werding | ............... | B05B 1/3436 |
| | | | | | | 239/404 |
| 6,186,417 | B1 | * | 2/2001 | Ho | ........................ | B05B 1/3436 |
| | | | | | | 239/491 |
| 6,289,676 | B1 | | 9/2001 | Prociw et al. | | |
| 8,091,805 | B2 | | 1/2012 | Paterson | | |
| 8,567,198 | B2 | | 10/2013 | Magni et al. | | |
| 9,400,104 | B2 | | 7/2016 | Low et al. | | |
| 2009/0255120 | A1 | | 10/2009 | McMasters et al. | | |
| 2009/0256007 | A1 | * | 10/2009 | McMasters | ............... | F23R 3/28 |
| | | | | | | 239/463 |

(Continued)

FOREIGN PATENT DOCUMENTS

| EP | 1 793 165 | 6/2007 |
| EP | 2 466 207 | 6/2012 |

OTHER PUBLICATIONS

Woodward Fst, Inc.; APS500-R Primary Circuit Tip; Reference P/N 527P899-01; Oct. 22, 2018.

(Continued)

*Primary Examiner* — Qingzhang Zhou
(74) *Attorney, Agent, or Firm* — Reinhart Boerner Van Deuren P.C.

(57) ABSTRACT

A tip for a nozzle of a fuel injector and an associated method are provided. The tip includes a tip body and a swirler. The swirler includes a plurality of pre-swirl passages which fluidly communicate an internal cavity of the swirler with a feed annulus. The swirler also includes a plurality of swirl chamber passages which fluidly communicate a swirl chamber with the feed annulus. Methods include manufacturing at least a portion of the swirler by additive manufacturing.

19 Claims, 18 Drawing Sheets

(56) References Cited

U.S. PATENT DOCUMENTS

2014/0158796 A1   6/2014   Buelow et al.
2018/0135576 A1   5/2018   Pyle et al.

OTHER PUBLICATIONS

Woodward Fst, Inc.; APS500-R Primary Tip; Reference P/N 527P899-01; Mar. 15, 2004.
Figs. 4.15 and 4.16 from "Atomization and Sprays" by Arthur H. Lefebvre, p. 117, 1989, Taylor & Francis Publisher.

* cited by examiner

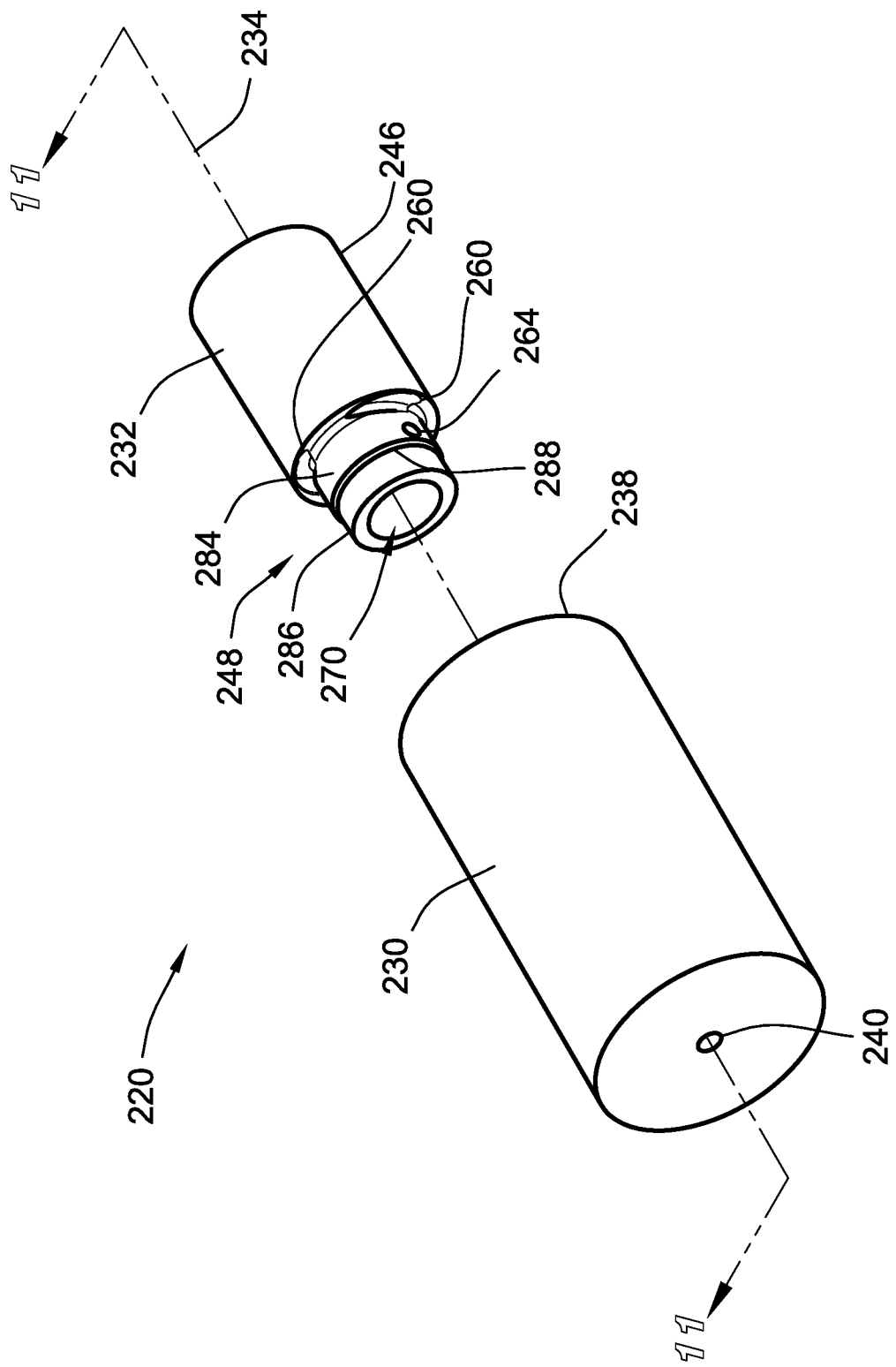

PRE-SWIRL PRESSURE ATOMIZING TIP

FIELD OF THE INVENTION

This invention generally relates to fuel injectors, and more particularly to atomizing tips used on fuel injectors.

BACKGROUND OF THE INVENTION

Fuel injectors have been used in many applications relating to air-breathing propulsion systems, including, for example, in ramjets, scramjets, and in gas turbine engines such as those used in aviation. Generally speaking, these systems typically include a section for compressing inlet air, a combustion section for combusting the compressed air with fuel, and an expansion section where the energy from the hot gas produced by combustion of the fuel is converted into mechanical energy. The exhaust gas from the expansion section may be used to achieve thrust or as a source of heat and energy.

Such injectors typically employ a nozzle from which the fuel exits just prior to combustion. These nozzles include a tip which typically incorporates features used to promote a desired fuel droplet distribution in the fuel spray. Such features may include swirl chambers, tip geometry, atomizers, etc.

While such nozzles have proven to be reliable, the applicant herein as found that under certain conditions, proper droplet size distribution may be less than desirable. For example, during high altitude conditions, droplet size distribution may be less than desirable to maintain engine operations. The applicant herein has found that one factor causing this undesirable condition is a lack of a strong tangential component when the fuel is swirled prior to exiting the nozzle. This lack of a strong tangential component can lead to spray cone collapse.

It has also been found that the assembly and construction of existing nozzles has given rise to scrap and rework issues. Indeed, as stated above, the nozzles employ a tip. The tip includes a tip body and a swirler which is inserted into the tip body. Fixation of the swirler within the tip body is achieved by mounting the swirler into the tip body. The applicant herein has found that mounting the swirler in the tip body can lead to plastic deformation of features of either of the aforementioned components which ultimately affects the flow and spray characteristics.

As such, there is a need in the art for an improved nozzle tip which avoids or eliminates the above drawbacks. The invention provides such a tip. These and other advantages of the invention, as well as additional inventive features, will be apparent from the description of the invention provided herein.

BRIEF SUMMARY OF THE INVENTION

In one aspect, the invention provides a tip for a nozzle of a fuel injector. An embodiment of such a tip includes a tip body defining a longitudinal axis of the tip and a swirler situated within the tip body. The swirler includes a plurality of pre-swirl passages. Each one of the plurality of pre-swirl passages has a longitudinal axis which extends in both a radial and axial direction relative to the longitudinal axis of the tip. The tip also includes a feed annulus receiving a flow of fuel from the plurality of pre-swirl passages wherein the plurality of pre-swirl passages are configured and arranged such that the flow of fuel entering the feed annulus has a flow velocity having a tangential component. The swirler includes a plurality of swirl chamber passages receiving the flow of fuel from the feed annulus. Each one of the plurality of swirl chamber passages includes a longitudinal axis which extends in only the radial direction relative to the longitudinal axis of the tip. The swirler also includes a swirl chamber receiving the flow of fuel from the feed annulus via the swirl chamber passages.

In certain embodiments, the feed annulus is formed between an interior radially facing surface of the tip body and an exterior radially surface of the swirler. The feed annulus is radially outside of the swirl chamber relative to a longitudinal axis of the tip.

In certain embodiments, the longitudinal axis of each of the plurality pre-swirl passages extends along a tapered helical path or alternatively a straight path. In certain embodiments, the longitudinal axis of each of the plurality of swirl chamber passages is one of straight or curved.

In certain embodiments, at least a portion of the swirler is formed by additive manufacturing.

In another aspect, a tip for a nozzle of a fuel injector is provided. An embodiment of such a tip includes a tip body and a swirler contained within the tip body. The swirler includes an inlet cavity for receiving a flow of fuel entering the tip body. A feed annulus is in fluid communication with the inlet cavity and downstream from the inlet cavity relative to a direction of fuel flow through the tip. A swirl chamber is in fluid communication with the feed annulus and downstream from the feed annulus relative to the direction of fuel flow through the tip. The feed annulus is formed between an interior radially facing surface of the tip body and an exterior radially surface of the swirler. The feed annulus is at least one of axially downstream or radially outside of the swirl chamber relative to a longitudinal axis of the tip.

In certain embodiments according to this aspect, the inlet cavity and feed annulus are in fluid communication via a plurality of pre-swirl passages. Each one of the plurality of pre-swirl passages has a longitudinal axis which extends in both a radial and axial direction relative to a longitudinal axis defined by the tip. In certain embodiments according to this aspect, longitudinal axis of each of the plurality pre-swirl passages extends along one of a tapered helical path or a straight path.

In certain embodiments according to this aspect, the feed annulus and swirl chamber are in fluid communication via a plurality of swirl chamber passages. Each one of the plurality of swirl chamber passages includes a longitudinal axis which extends in only the radial direction relative to a longitudinal axis defined by the tip. The longitudinal axis of each one of the swirl chamber passages extends along one of a straight or a curved path.

In certain embodiments according to this aspect, the plurality of pre-swirl passages are configured and arranged such that the flow of fuel entering the feed annulus has a flow velocity having a tangential component.

In yet another aspect, a method of forming tip for a nozzle of a fuel injector is provided. An embodiment of such a method includes providing a swirler and providing a tip body. This embodiment of the method also includes inserting the swirler into a passage of the tip body. The swirler has a plurality of pre-swirl passages and a plurality of swirl chamber passages. This embodiment of the method also includes fixing the swirler within the passage of the tip body such that a feed annulus is formed between a radially interior facing surface of the tip body and a radially exterior facing surface of the swirler to place the plurality of pre-swirl passages in fluid communication with the plurality of swirl chamber passages.

In certain embodiments according to this aspect, the step of providing the swirler includes manufacturing at least a portion of the swirler by additive manufacturing. In certain embodiments according to this aspect, the step of manufacturing at least a portion of the swirler by additive manufacturing includes forming the pre-swirl passages by additive manufacturing.

In certain embodiments according to this aspect, the step of forming the pre-swirl passages by additive manufacturing includes forming the pre-swirl passages such that each one of the pre-swirl passages includes a longitudinal axis which moves along one of a tapered helical path or a straight path.

In certain embodiments according to this aspect, the step of manufacturing at least a portion of the swirler by additive manufacturing includes forming the swirl chamber passages by additive manufacturing.

In certain embodiments according to this aspect, the step of forming the swirl chamber passages by additive manufacturing includes forming the swirl chamber passages such that each one of the swirl chamber passages has a longitudinal axis which moves along one of a straight path or a curved path.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 10 is a perspective exploded view of another embodiment of a pre-swirl pressure atomizing tip;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, the following describe various embodiments of a pre-swirl pressure atomizing tip according to the teachings herein. The use of this tip is not constrained to any particular nozzle of any particular fuel injector device, and as such, may be readily incorporated into any nozzle with only minor adaptation, if any at all. As will be understood from the following, the tip described herein advantageously promotes proper atomization and fuel dispersion in a variety of operating conditions, including but not limited to maintaining engine operation. The tip achieves this by a variety of mechanical features, which are in some cases achieved by additive manufacturing.

Figure 1:
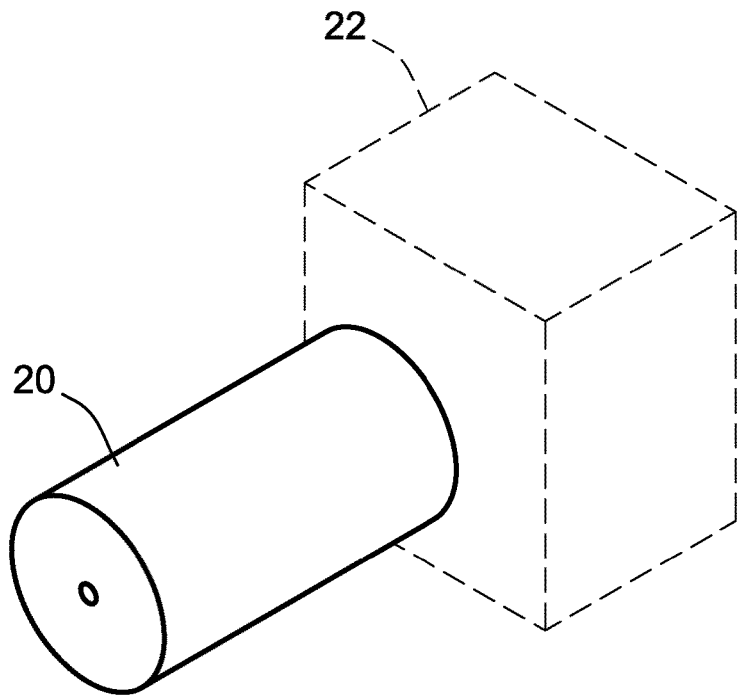
FIG. 1 is a perspective view of an embodiment of a pre-swirl pressure atomizing tip.
Figure 2:
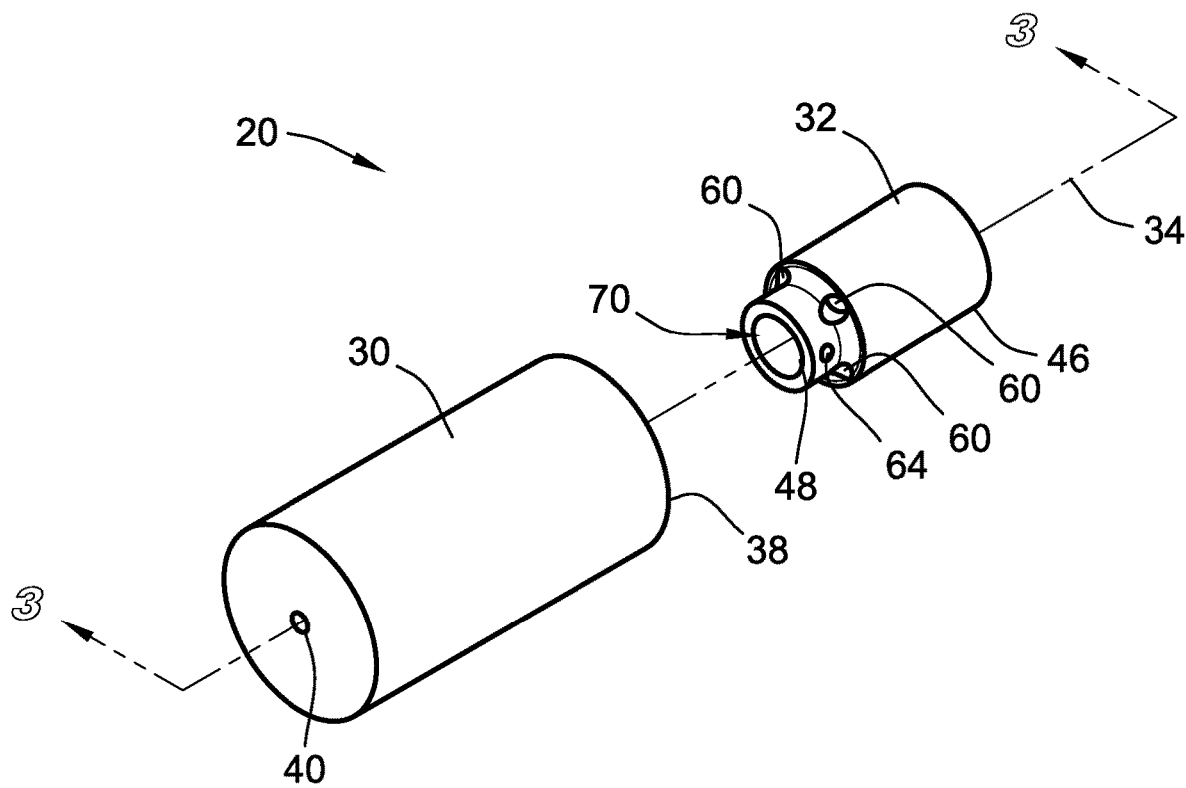
FIG. 2 is an exploded view of the tip of FIG. 1.

Turning first to FIG. 1, the same illustrates a tip 20 shown associated with a schematic representation of a nozzle 22. As stated above, nozzle 22 and the fuel injector device it is associated with may take on any form. With reference to FIG. 2, tip 20 includes a tip body 30 and a swirler 32. Tip body 30 defines a longitudinal axis 34 along which swirler 32 is centered on within an interior bore 36 (see FIG. 3) of tip body 30. All or a portion of swirler 32 may be press fit within interior bore 36. Additionally or in the alternative, swirler 32 may also be brazed, welded, or otherwise mechanically joined to tip body 30. It is also contemplated that the entirety of tip body 30 and swirler 32 may be formed as a single piece by way of forming these components together via additive manufacturing. As such, a description of swirler 32 as contained in, situated, etc., tip body 30 should be taken to include a swirler 32 which is formed unitarily with tip body 30. It is also contemplated that either tip body 30 or swirler 32 may include portions which are formed by a combination of additive manufacturing and conventional machining.

Figure 3:
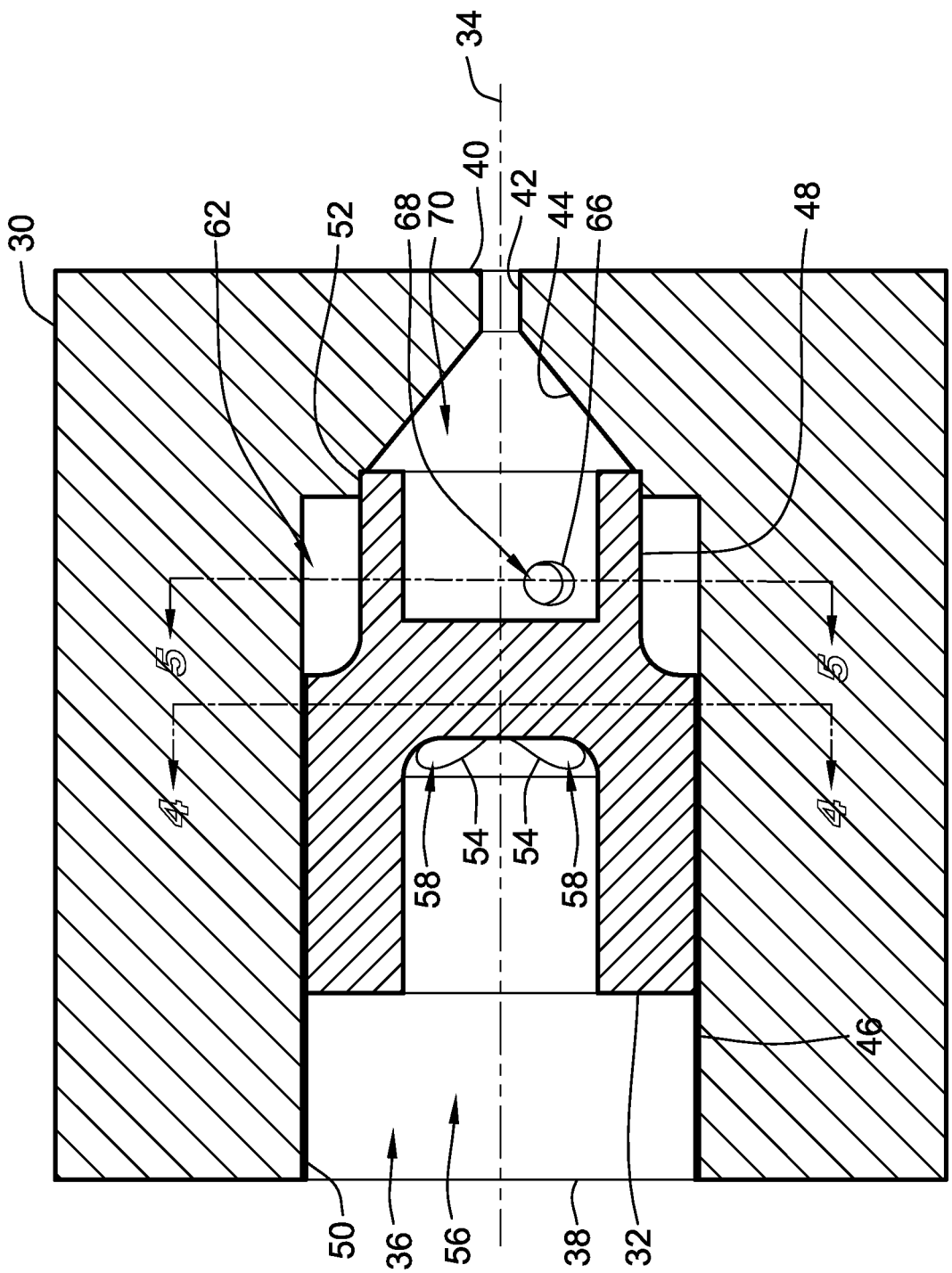
FIG. 3 is a cross section of the tip of FIG. 1.

Tip body 30 includes an opening 38 in one axial end thereof which defines the opening of interior bore 36 (see FIG. 3). An orifice 40 at the axial end of tip body 30 opposite the end at which opening 38 is formed as shown. As such, bore 36 extends between opening 38 and orifice 40. While shown with a generally cylindrical outer shape, tip body 30 may take on any shape to accommodate the features described herein.

Swirler 32 includes a main body portion 46 and a swirler portion 48 having a reduced outer diameter relative to main body portion 46. Visible in FIG. 2 is a plurality of pre-swirl outlets 60. As will be described in detail below, these pre-swirl outlets 60 communicate fuel flowing through an inlet cavity 56 of swirler 32 with a feed annulus 62 (see FIG. 3) formed radially between swirler portion 48 and an interior of tip body 30. Fuel then flows through a plurality of swirl chamber inlets 64 into a swirl chamber 70 where the fuel is swirled again prior to exiting orifice 40.

Turning now to FIG. 3, the above summarized configuration will be described in greater detail. As shown in FIG. 3, swirler 32 is inserted within bore 36 such that the opening to inlet cavity 56 faces opening 38 of bore 36. With this configuration, fuel entering opening 38 flows into inlet cavity 56. A plurality of pre-swirl inlets 54 are situated at the other end of inlet cavity 56. These pre-swirl inlets open to pre-swirl passages 58 extending between pre-swirl inlets 58 and pre-swirl outlets 60 (see FIG. 2). Pre-swirl inlets 58 and pre-swirl outlets 60 may include a variety of features, e.g. chamfered lead in areas, hard edges, etc., to obtain a desired flow characteristic through pre-swirl passages 58.

As will be explained in greater detail below, pre-swirl passages 58 define longitudinal axes which extend in directions having both an axial component (i.e. parallel to longitudinal axis 34) and a radial component (e.g. perpendicular to longitudinal axis 34). These longitudinal axes of pre-swirl passages 58 are also straight such that pre-swirl passages 58 extend in a straight line from inlet cavity 36 to feed annulus 62.

Upon exiting pre-swirl outlets 60 (see FIG. 2), fuel then encounters the above-introduced feed annulus 62. Feed annulus 62 is radially formed between an interior radially inward facing surface 50 of tip body 30 and a radially outward facing surface 52 provided on swirl chamber portion 48 of swirler 32. As a result of this configuration, feed annulus is radially outside of swirl chamber 70 as shown. Additionally, feed annulus 62 and swirl chamber 70 are axially offset from one another as shown.

Once within the feed annulus 62, fuel then flows into swirl chamber inlets 64 (see FIG. 2) formed on swirl chamber portion 48. This fuel then exits swirl chamber outlets 66 and enters swirl chamber 70. A plurality of machined swirl chamber passages 68 extend between swirl chamber inlets 64 and swirl chamber outlets 66. Swirl chamber inlets 64 and swirl chamber outlets 66 may include a variety of features, e.g. chamfered lead in areas, hard edges, etc., to obtain a desired flow characteristic through swirl chamber passages 68. Although two swirl chamber passages 68 are shown, fewer or greater passages could be utilized.

The fuel is then swirled within swirl chamber 70 and exits tip 20 via orifice 40. Orifice 40 may take on any geometry necessary to achieve a desired cone formation and droplet dispersion. In the illustrated embodiment, fuel encounters a straight outlet section 42 just prior to exiting orifice 40. Prior to encountering straight outlet section 42, fuel encounters a conical outlet section 44 after exiting swirl chamber 70. As such, swirl chamber 70, conical outlet section 44 and straight outlet section may be considered to form a swirl region of tip 20.

Although not illustrated in FIG. 3, swirler 32 may include features on its exterior such as grooves for receiving seals or other devices used to ensure an adequate seal is formed or between swirler 32 and tip body 30. Swirler 32 may be mounted within tip body 30 using any mechanical means. As a result, swirler 32 is sufficiently sealed and constrained within bore 36.

Figure 4:
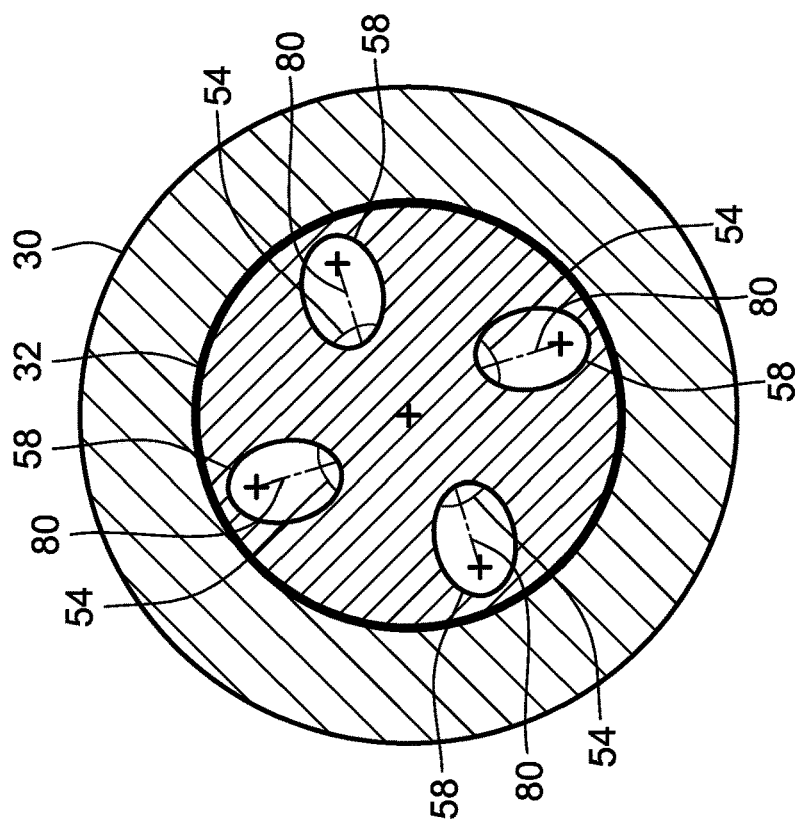

Turning now to FIG. 4, the same illustrates a cross section taken in a plane through which pre-swirl passages 58 extend. As can be seen in this view, each pre-swirl passage 58 defines a longitudinal axis 80 which is linear, but has both axial and radial directional components. These pre-swirl passages 58 are equally spaced as shown. While four pre-swirl passages are illustrated, fewer or greater passages could be utilized. As may be seen in this view, axes 80 do not intersect center axis 34 (see FIG. 2). This offset allows for the introduction of a tangential component to the flow velocity of the fuel as it enters feed annulus 62.

Figure 5:
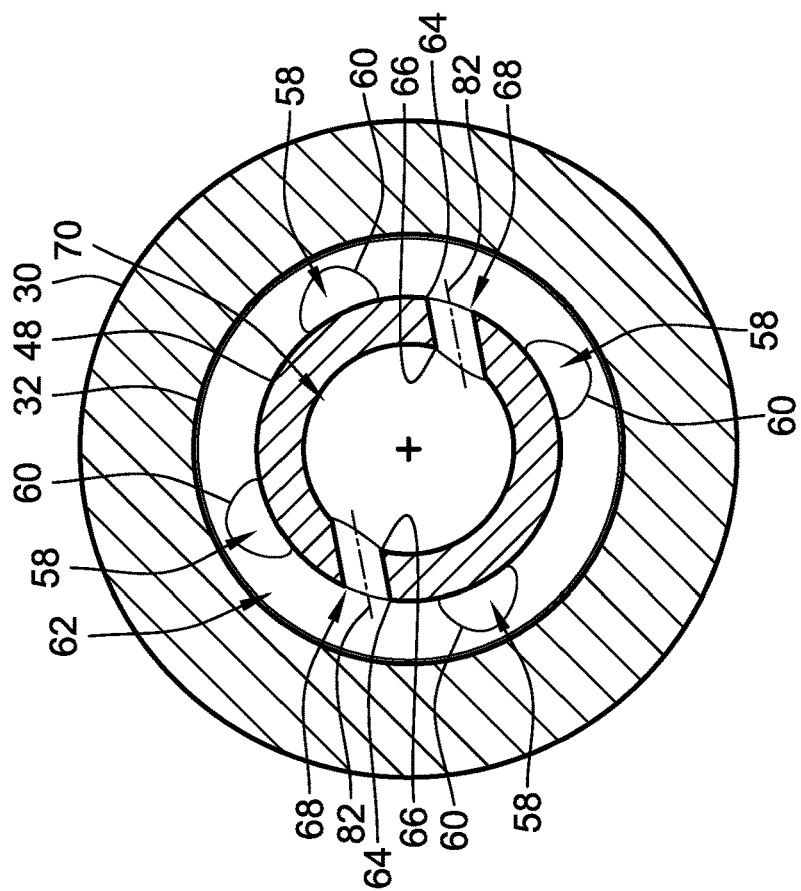
FIGS. 4-5 are cross sections of the tip of FIG. 1, taken in planes which are normal to the plane of the cross section shown in FIG. 3.

With reference to FIG. 5, the same illustrates a cross section taken in a plane through which swirl chamber passages 68 extend. As may be seen in this view, each swirl chamber passage 68 defines a longitudinal axis 82 which extends only in the radial direction, i.e. it only includes a radial direction component, unlike longitudinal axes 80 which include both a radial and axial direction component. With this arrangement, swirl chamber passages 68 are arranged generally tangential to swirl chamber 70. These features allow for imparting a significant tangential component to the flow velocity of fuel through tip 40, thereby eliminating or reducing the likelihood of spray cone collapse. In particular, flow annulus 62 is arranged such that fuel swirls within the same as fuel exits tangentially from pre-swirl passages 58. As a result, this swirling fuel then enters swirl chamber passages 68 and ultimately swirl chamber 70 with less losses and thus has more tangential spin within swirl chamber 70.

Figure 6:
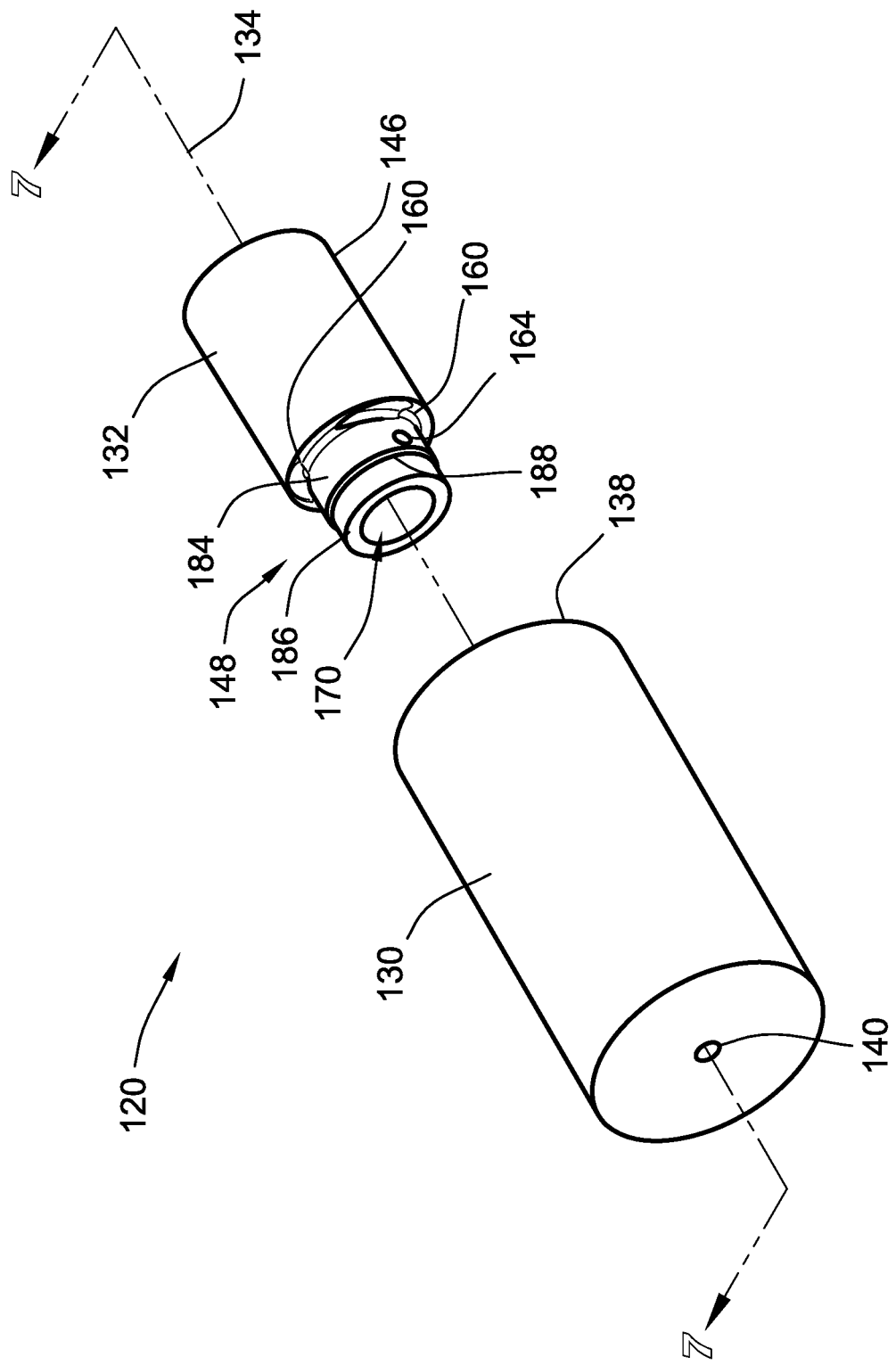
FIG. 6 is a perspective exploded view of another embodiment of a pre-swirl pressure atomizing tip.

Turning now to FIG. 6, another embodiment of a tip 120 according to the teachings herein is illustrated in an exploded view. As will be understood from the following, this tip 120 is of the same construction as that described above relative to tip 20 except for several notable differences. As one example, the pre-swirl passages 158 (see FIGS. 7-8) follow a tapered helical path as opposed to a straight path as was the case with pre-swirl passages 58. As another example, pre-swirl passages 158 are formed via additive manufacturing to achieve their complex geometry. These and other structural characteristics are described below.

Figure 7:
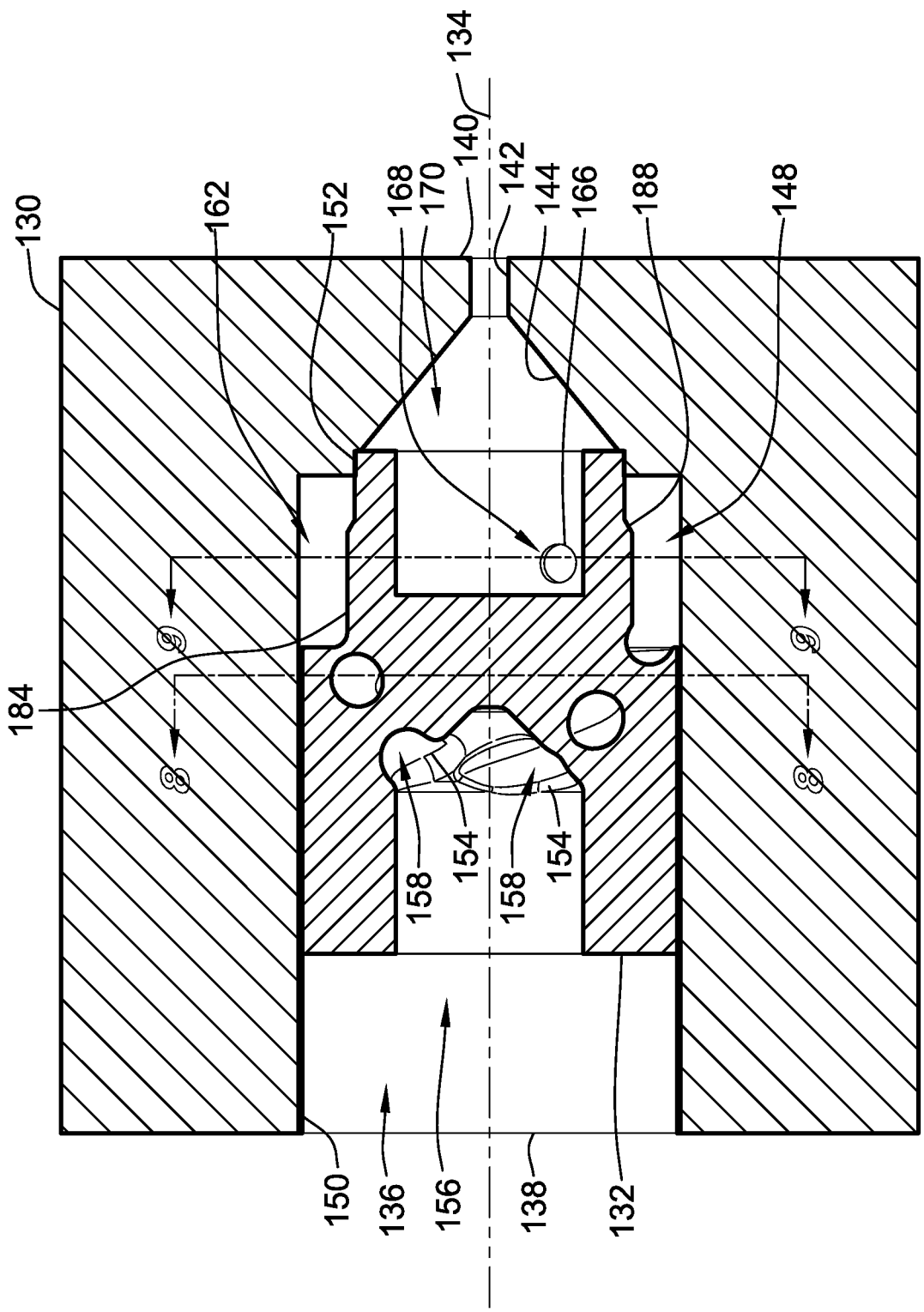
FIG. 7 is a cross section the tip of FIG. 6.

As shown in FIG. 7, tip 120 includes a tip body 130 and a swirler 132. Swirler 132 is inserted within a bore 136 of tip body 130 along an axis 134 defined by tip body 130. An opening to an inlet cavity 156 of swirler 132 faces an opening 138 of bore 136. With this configuration, fuel entering opening 138 flows into inlet cavity 156. A plurality of pre-swirl inlets 154 are situated at the other end of inlet cavity 156. These pre-swirl inlets 154 open to pre-swirl passages 158 extending between pre-swirl inlets 158 and pre-swirl outlets 160 (see FIG. 6). Pre-swirl inlets 158 and pre-swirl outlets 160 may include a variety of features, e.g. chamfered lead in areas, hard edges, etc., to obtain a desired flow characteristic through pre-swirl passages 158.

Pre-swirl passages 158 define longitudinal axes which extend in directions having both an axial component (i.e. parallel to longitudinal axis 134) and a radial component (e.g. perpendicular to longitudinal axis 134). These longitudinal axes of pre-swirl passages 158 are also curved such that pre-swirl passages 158 extend in a tapered helical path from inlet cavity 136 to a feed annulus 162 arranged in generally the same manner as feed annulus 162 described above.

Upon exiting pre-swirl outlets 160 (see FIG. 6), fuel then encounters the above-introduced feed annulus 162. Feed annulus 162 is radially formed between an interior radially inward facing surface 150 of tip body 130 and a radially outward facing surface 152 provided on swirl chamber portion 148 of swirler 132. As a result of this configuration, feed annulus is radially outside of swirl chamber 170 as shown. Additionally, feed annulus 162 and swirl chamber 170 are axially offset from one another as shown.

Once within the feed annulus 162, fuel then flows into swirl chamber inlets 164 (see FIG. 6) formed on swirl chamber portion 148. This fuel then exits swirl chamber outlets 166 and enters swirl chamber 170. A plurality of machined swirl chamber passages 168 extend between swirl chamber inlets 164 and swirl chamber outlets 166. Swirl chamber inlets 164 and swirl chamber outlets 166 may include a variety of features, e.g. chamfered lead in areas, hard edges, etc., to obtain a desired flow characteristic through swirl chamber passages 168. Although two swirl chamber passages 168 are shown, fewer or greater passages could be utilized.

The fuel is then swirled within swirl chamber 170 and exits tip 120 via orifice 140. Orifice 140 may take on any geometry necessary to achieve a desired cone formation and droplet dispersion. In the illustrated embodiment, fuel encounters a straight outlet section 142 just prior to exiting orifice 140. Prior to encountering straight outlet section 142, fuel encounters a conical outlet section 144 after exiting swirl chamber 170. As such, swirl chamber 170, conical outlet section 144 and straight outlet section may be considered to form a swirl region of tip 120.

As was the case with swirler 32, swirler 132 may include features on its exterior such as grooves for receiving seals or other devices used to ensure an adequate seal is formed or between swirler 132 and tip body 130.

Figure 8:
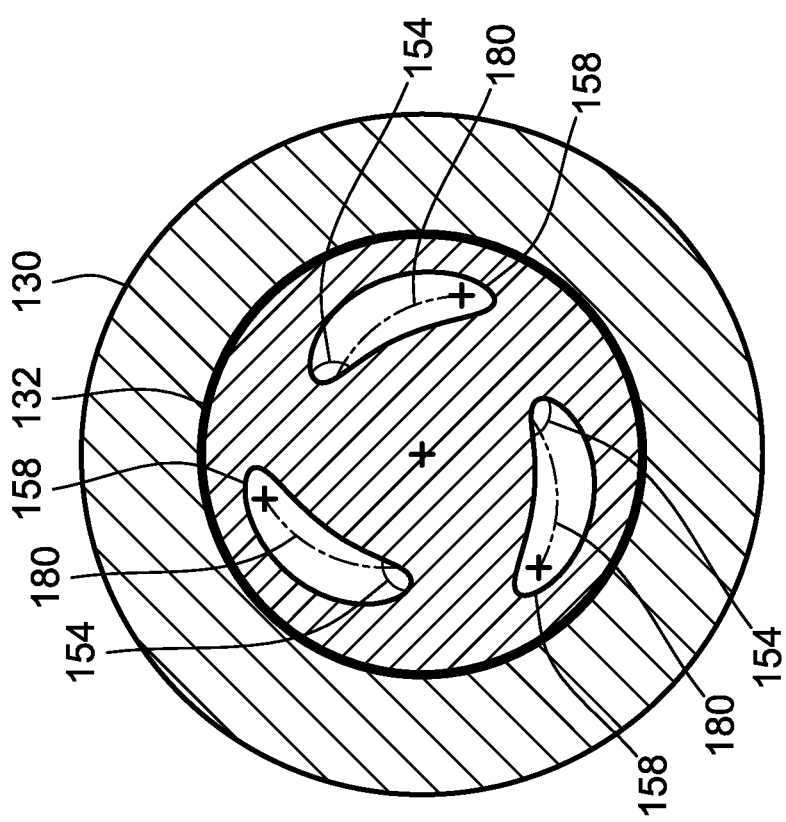

Turning now to FIG. 8, the same illustrates a cross section taken in a plane through which pre-swirl passages 158 extend. As can be seen in this view, each pre-swirl passage 158 defines a longitudinal axis 180 which is curved and follows a tapered helical path, and thus has both axial and radial directional components. These pre-swirl passages 158 are equally spaced as shown. While three pre-swirl passages are illustrated, fewer or greater passages could be utilized. This tapered helical path allows for the introduction of a tangential component to the flow velocity of the fuel as it enters feed annulus 162.

As already mentioned above, these pre-swirl passages 158 are formed via additive manufacturing. Use of this process allows for the relative complex geometry of these passages 158, in particular, their tapered helical path. To achieve this, swirler 132 may be manufactured in its entirety by additive manufacturing, with subsequent machining done to achieve other features, e.g. swirl chamber 170, swirl chamber passages 168, etc. Alternatively, it is also contemplated that a machined substrate could be utilized, with subsequent material "built up" on this substrate using additive manufacturing to achieve the geometry described herein. As will be readily understood, use of additive manufacturing allows for the advantage of having pre-swirl passages 158 of complex geometry to assist in imposing a desired tangential component to flow velocity.

Figure 9:
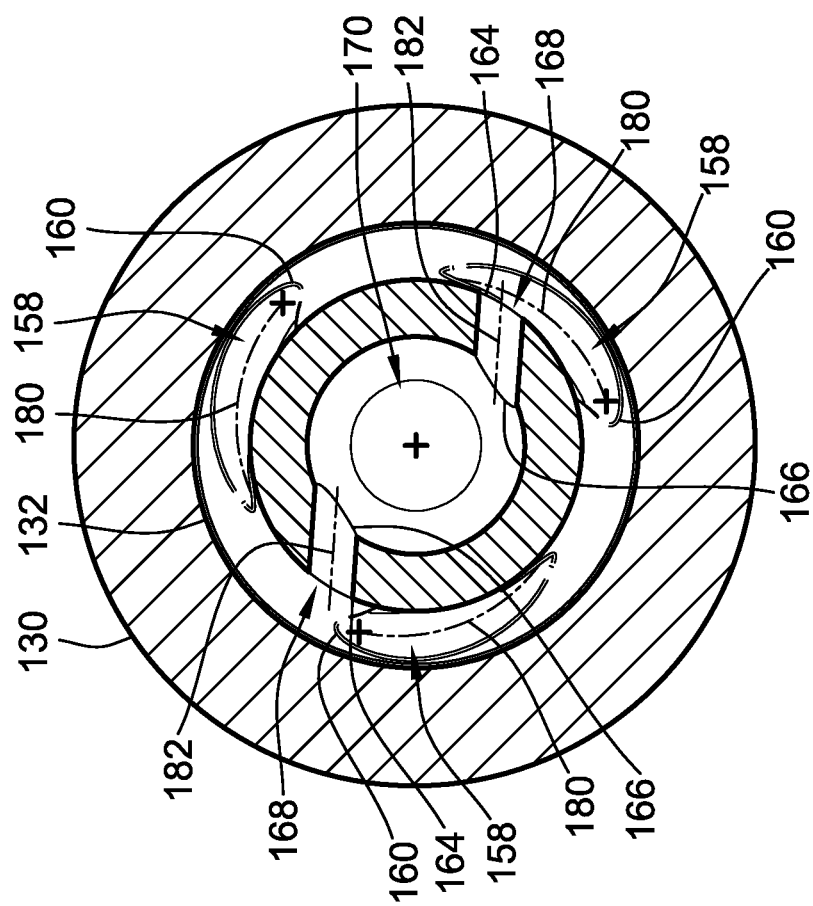
FIGS. 8-9 are cross sections of the tip of FIG. 6, taken in planes which are normal to the plane of the cross section shown in FIG. 7.

With reference to FIG. 9, the same illustrates a cross section taken in a plane through which swirl chamber passages 168 extend. As may be seen in this view, each swirl chamber passage 168 defines a longitudinal axis 182 which extends only in the radial direction, i.e. it only includes a radial direction component, unlike longitudinal axes 180 which include both a radial and axial direction component. With this arrangement, swirl chamber passages 168 are arranged generally tangential to swirl chamber 170. These features allow for imparting a significant tangential component to the flow velocity of fuel through tip 140.

Turning now to FIG. 10, another embodiment of a tip 220 according to the teachings herein is illustrated in an exploded view. As will be understood from the following, this tip 220 is of the same construction as that described above relative to tip 120 in that it utilizes pre-swirl passages 258 (see FIGS. 11-13) which follow a tapered helical path formed via additive manufacturing. One notable exception between tip 220 and tip 120 above is that its swirl chamber 270 is partially formed via additive manufacturing and includes a flow annulus 290 in the region of swirl chamber outlets 266 (see FIG. 13). Details of the structural configuration of this tip 220 are described in the following.

Figure 11:
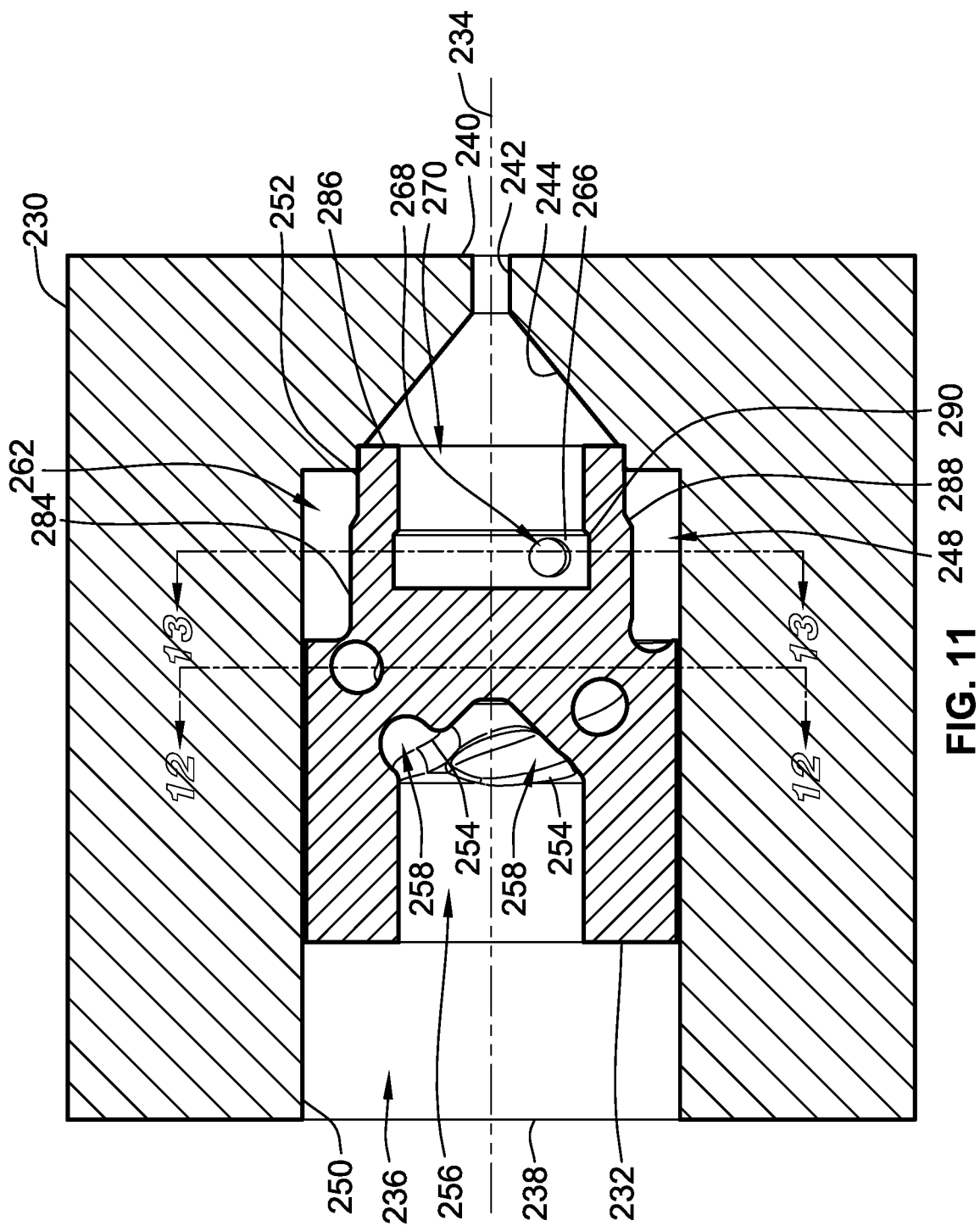
FIG. 11 is a cross section of the tip of FIG. 10.

As shown in FIG. 11, tip 220 includes a tip body 230 and a swirler 232. Swirler 232 is inserted within a bore 236 of tip body 230 along an axis 234 defined by tip body 230. An opening to an inlet cavity 256 of swirler 232 faces an opening 238 of bore 236. With this configuration, fuel entering opening 238 flows into inlet cavity 256. A plurality of pre-swirl inlets 254 are situated at the other end of inlet cavity 256. These pre-swirl inlets 254 open to pre-swirl passages 258 extending between pre-swirl inlets 258 and pre-swirl outlets 260 (see FIG. 10). Pre-swirl inlets 258 and pre-swirl outlets 260 may include a variety of features, e.g. chamfered lead in areas, hard edges, etc., to obtain a desired flow characteristic through pre-swirl passages 158.

Pre-swirl passages 258 define longitudinal axes which extend in directions having both an axial component (i.e. parallel to longitudinal axis 234) and a radial component (e.g. perpendicular to longitudinal axis 234). These longitudinal axes of pre-swirl passages 258 are also curved such that pre-swirl passages 258 extend in a tapered helical path from inlet cavity 236 to a feed annulus 262 arranged in generally the same manner as feed annulus 262 described above.

Upon exiting pre-swirl outlets 260 (see FIG. 10), fuel then encounters the above-introduced feed annulus 262. Feed annulus 262 is radially formed between an interior radially inward facing surface 250 of tip body 230 and a radially outward facing surface 252 provided on swirl chamber portion 248 of swirler 232. As a result of this configuration, feed annulus is radially outside of swirl chamber 270 as shown. Additionally, feed annulus 262 and swirl chamber 270 are axially offset from one another as shown.

Once within the feed annulus 262, fuel then flows into swirl chamber inlets 264 (see FIG. 10) formed on swirl chamber portion 248. This fuel then exits swirl chamber outlets 266 and enters swirl chamber 270. A flow annulus 290 is formed in the region of swirl chamber outlets 266. This flow annulus 290 may be achieved via additive manufacturing. Thereafter, a swirl chamber 270 may be machined into swirl chamber 270 downstream of flow annulus. Alternatively, the entirety of swirl chamber 270 may be formed via additive manufacturing, with flow annulus 290 thereafter being introduced via machining.

A plurality of machined swirl chamber passages 268 extend between swirl chamber inlets 264 and swirl chamber outlets 266. Swirl chamber inlets 264 and swirl chamber outlets 266 may include a variety of features, e.g. chamfered lead in areas, hard edges, etc., to obtain a desired flow characteristic through swirl chamber passages 268. Although two swirl chamber passages 268 are shown, fewer or greater passages could be utilized.

The fuel is then swirled within swirl chamber 270 and exits tip 220 via orifice 240. Orifice 240 may take on any geometry necessary to achieve a desired cone formation and droplet dispersion. In the illustrated embodiment, fuel encounters a straight outlet section 242 just prior to exiting orifice 240. Prior to encountering straight outlet section 242, fuel encounters a conical outlet section 244 after exiting swirl chamber 270. As such, swirl chamber 270, conical outlet section 244 and straight outlet section may be considered to form a swirl region of tip 220.

As was the case with swirlers 32, 132, swirler 132 may include features on its exterior such as grooves for receiving seals or other devices used to ensure an adequate seal is formed or between swirler 232 and tip body 230. Swirler 232 may be mounted within tip body 230 using any mechanical means. As a result, swirler 232 is sufficiently sealed and constrained within bore 236.

Figure 12:
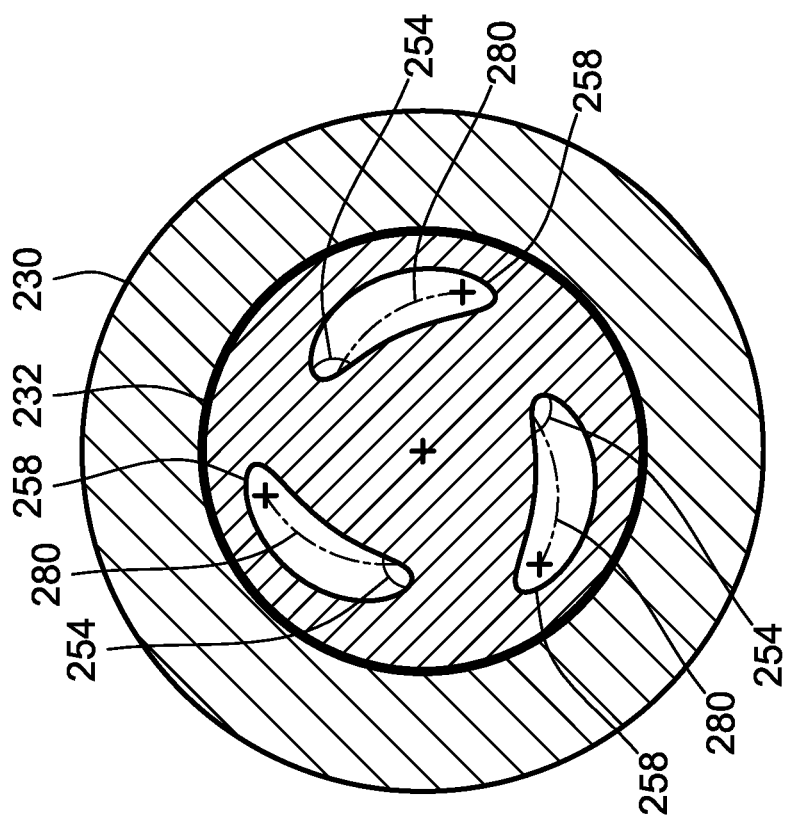

Turning now to FIG. 12, the same illustrates a cross section taken in a plane through which pre-swirl passages 258 extend. As can be seen in this view, each pre-swirl passage 258 defines a longitudinal axis 280 which is curved and follows a tapered helical path, and thus has both axial and radial directional components. These pre-swirl passages 258 are equally spaced as shown. While three pre-swirl passages are illustrated, fewer or greater passages could be utilized. This tapered helical path allows for the introduction of a tangential component to the flow velocity of the fuel as it enters feed annulus 262.

As already mentioned above, these pre-swirl passages 258 are formed via additive manufacturing using the same or a similar process as that described relative to pre-swirl passages 158, and thus the same configuration and advantages as pre-swirl passages 158 described above may be achieved.

Figure 13:
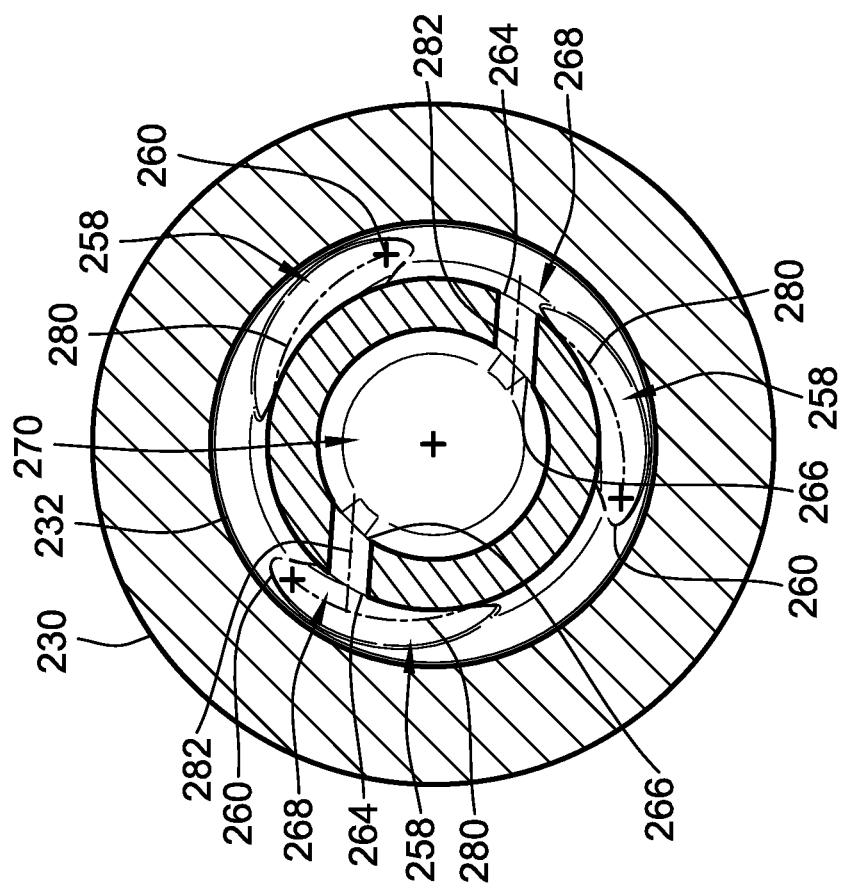
FIGS. 12-13 are cross sections of the tip of FIG. 10, taken in planes which are normal to the plane of the cross section shown in FIG. 11.

With reference to FIG. 13, the same illustrates a cross section taken in a plane through which swirl chamber passages 268 extend. As may be seen in this view, each swirl chamber passage 268 defines a longitudinal axis 282 which extends only in the radial direction, i.e. it only includes a radial direction component, unlike longitudinal axes 280 which include both a radial and axial direction component. With this arrangement, swirl chamber passages 268 are arranged generally tangential to swirl chamber 270. These features allow for imparting a significant tangential component to the flow velocity of fuel through tip 240.

Figure 14:
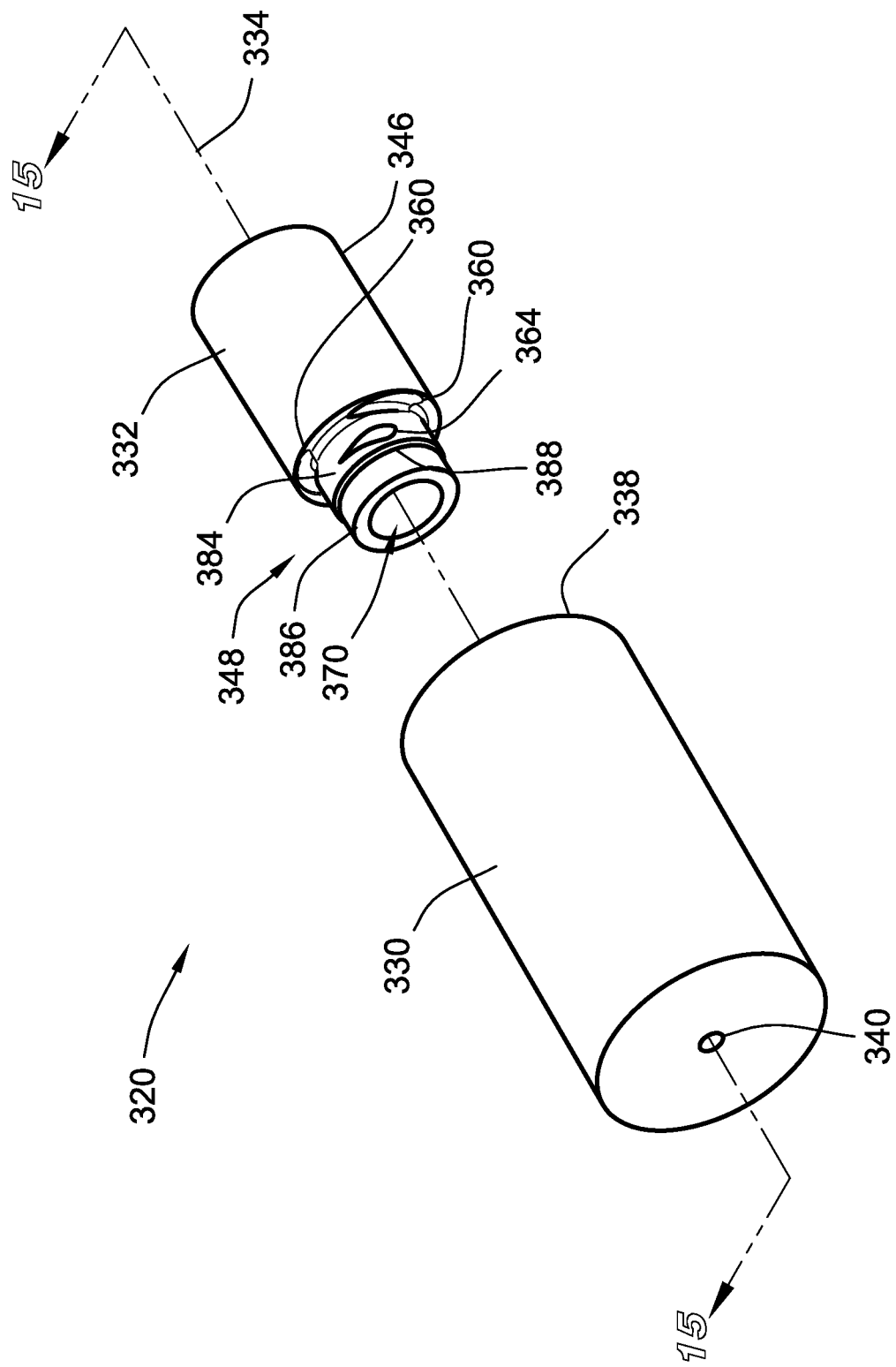
FIG. 14 is a perspective exploded view of another embodiment of a pre-swirl pressure atomizing tip.

Turning now to FIG. 14, another embodiment of a tip 320 according to the teachings herein is illustrated in an exploded view. As will be understood from the following, this tip 320 is of the same construction as that described above relative to tips 120 and 220 in that it utilizes pre-swirl passages 358 (see FIGS. 11-13) which follow a tapered helical path and are formed via additive manufacturing. This tip also includes a swirl chamber 370 formed partially by additive manufacturing and having a flow annulus 390 in the region of swirl chamber outlets 366 (see FIG. 15) as was the case with tip 220. One notable exception between tip 320 and tips 20, 120, and 120 is that its swirl chamber passages 368 (see FIG. 17) are curved not straight. This curved path of swirl chamber passages 368 is achieved via additive manufacturing. Details of the structural configuration of this tip 320 are described in the following.

Figure 15:
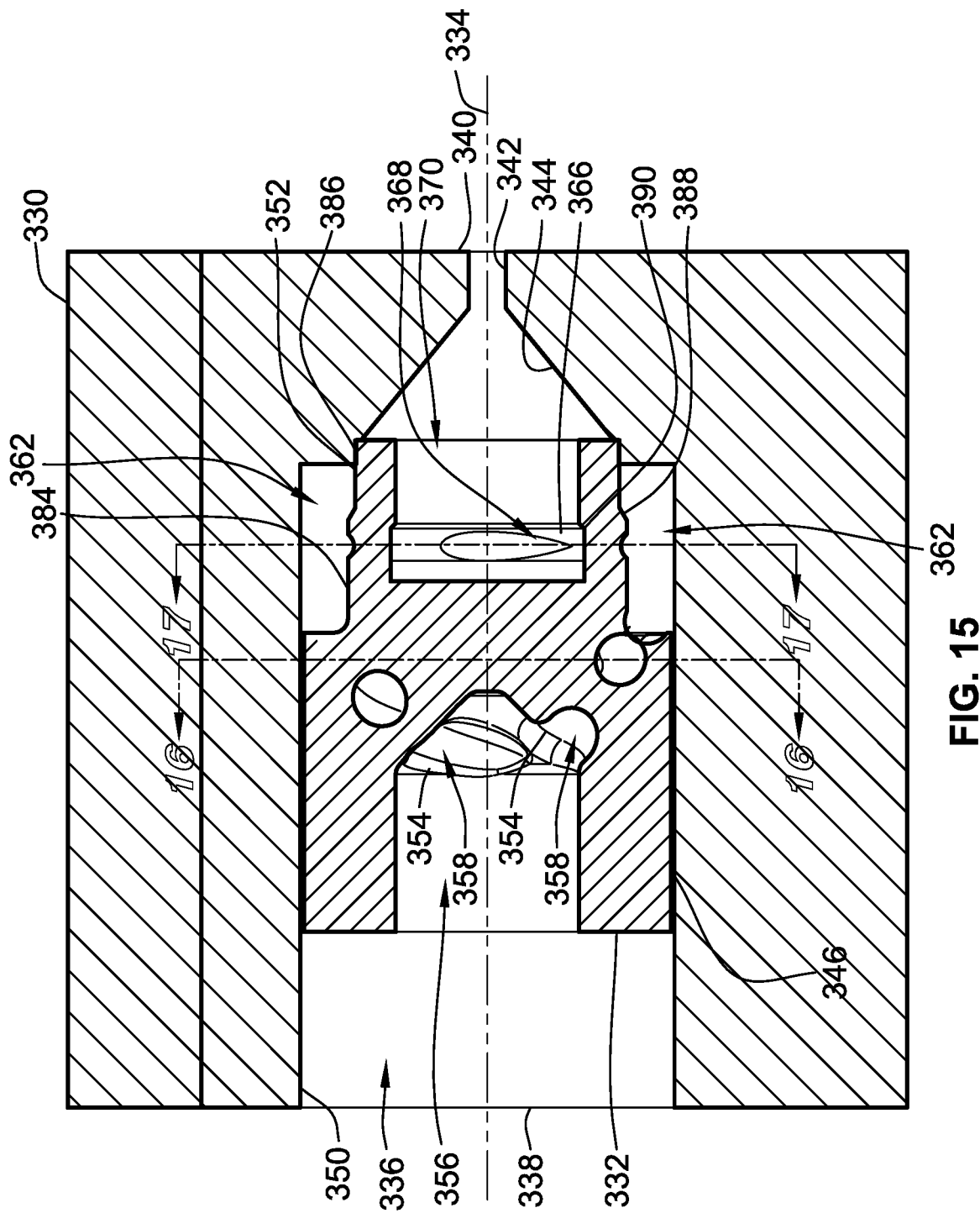
FIG. 15 is a cross section of the tip of FIG. 14.

As shown in FIG. 15, tip 320 includes a tip body 330 and a swirler 332. Swirler 332 is inserted within a bore 336 of tip body 330 along an axis 334 defined by tip body 330. An opening to an inlet cavity 356 of swirler 332 faces an opening 338 of bore 336. With this configuration, fuel entering opening 338 flows into inlet cavity 356. A plurality of pre-swirl inlets 354 are situated at the other end of inlet cavity 356. These pre-swirl inlets 354 open to pre-swirl passages 358 extending between pre-swirl inlets 354 and pre-swirl outlets 360 (see FIG. 10). Pre-swirl inlets 358 and pre-swirl outlets 360 may include a variety of features, e.g. chamfered lead in areas, hard edges, etc., to obtain a desired flow characteristic through pre-swirl passages 358.

Pre-swirl passages 358 define longitudinal axes which extend in directions having both an axial component (i.e. parallel to longitudinal axis 334) and a radial component (e.g. perpendicular to longitudinal axis 334). These longitudinal axes of pre-swirl passages 358 are also curved such that pre-swirl passages 358 extend in a tapered helical path from inlet cavity 336 to a feed annulus 362 arranged in generally the same manner as feed annulus 362 described above.

Upon exiting pre-swirl outlets 360 (see FIG. 14), fuel then encounters the above-introduced feed annulus 362. Feed annulus 362 is radially formed between an interior radially inward facing surface 350 of tip body 330 and a radially outward facing surface 352 provided on swirl chamber portion 348 of swirler 332. As a result of this configuration, feed annulus is radially outside of swirl chamber 370 as shown. Additionally, feed annulus 362 and swirl chamber 370 are axially offset from one another as shown.

Once within the feed annulus 362, fuel then flows into swirl chamber inlets 364 (see FIG. 14) formed on swirl chamber portion 348. This fuel then exits swirl chamber outlets 366 and enters swirl chamber 370. A flow annulus 390 is formed in the region of swirl chamber outlets 366. This flow annulus 390 may be achieved via additive manufacturing. Thereafter, a swirl chamber 370 may be machined into swirl chamber 370 downstream of flow annulus. Alternatively, the entirety of swirl chamber 370 may be formed via additive manufacturing, with the flow annulus thereafter being introduced via machining.

A plurality of swirl chamber passages 368 extend between swirl chamber inlets 364 and swirl chamber outlets 366. Swirl chamber inlets 364 and swirl chamber outlets 366 may include a variety of features, e.g. chamfered lead in areas, hard edges, etc., to obtain a desired flow characteristic through swirl chamber passages 368. Although two swirl chamber passages 368 are shown, fewer or greater passages could be utilized.

The fuel is then swirled within swirl chamber 370 and exits tip 320 via orifice 340. Orifice 340 may take on any geometry necessary to achieve a desired cone formation and droplet dispersion. In the illustrated embodiment, fuel encounters a straight outlet section 342 just prior to exiting orifice 340. Prior to encountering straight outlet section 342, fuel encounters a conical outlet section 344 after exiting swirl chamber 370. As such, swirl chamber 370, conical outlet section 344 and straight outlet section may be considered to form a swirl region of tip 320.

As was the case with swirlers 32, 132, 232, swirler 132 may include features on its exterior such as grooves for receiving seals or other devices used to ensure an adequate seal is formed or between swirler 332 and tip body 330. Swirler 332 may be mounted within tip body 330 using any mechanical means. As a result, swirler 332 is sufficiently sealed and constrained within bore 336.

Figure 16:
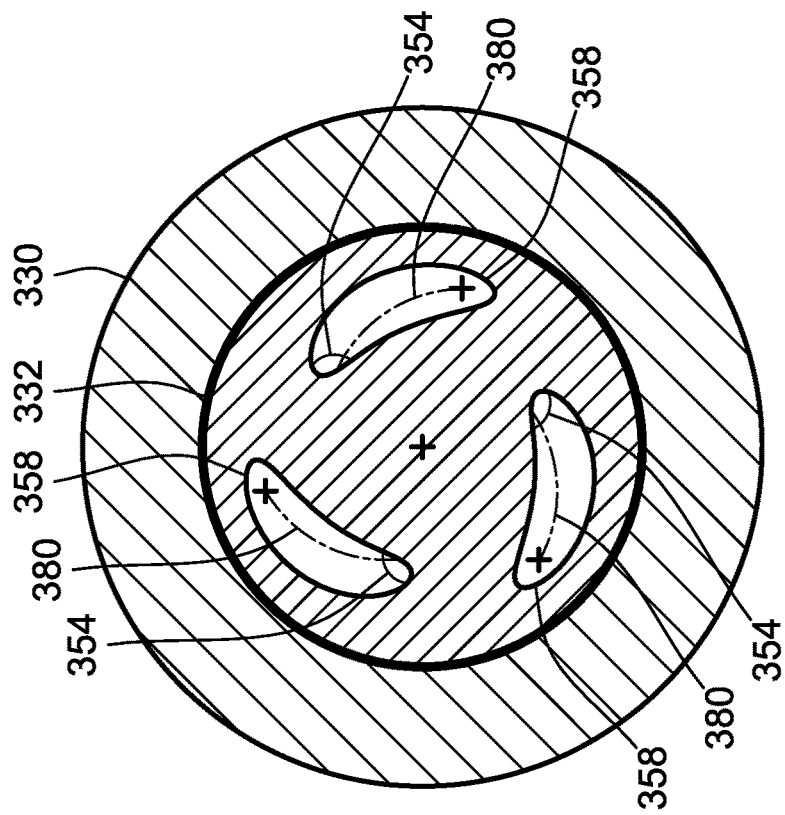

Turning now to FIG. 16, the same illustrates a cross section taken in a plane through which pre-swirl passages 358 extend. As can be seen in this view, each pre-swirl passage 358 defines a longitudinal axis 380 which is curved and follows a tapered helical path, and thus has both axial and radial directional components. These pre-swirl passages 358 are equally spaced as shown. While three pre-swirl passages are illustrated, fewer or greater passages could be utilized. This tapered helical path allows for the introduction of a tangential component to the flow velocity of the fuel as it enters feed annulus 362.

As already mentioned above, these pre-swirl passages 358 are formed via additive manufacturing using the same or a similar process as that described relative to pre-swirl passages 158, 258, and thus the same configuration and advantages as pre-swirl passages 158, 258 described above may be achieved.

Figure 17:
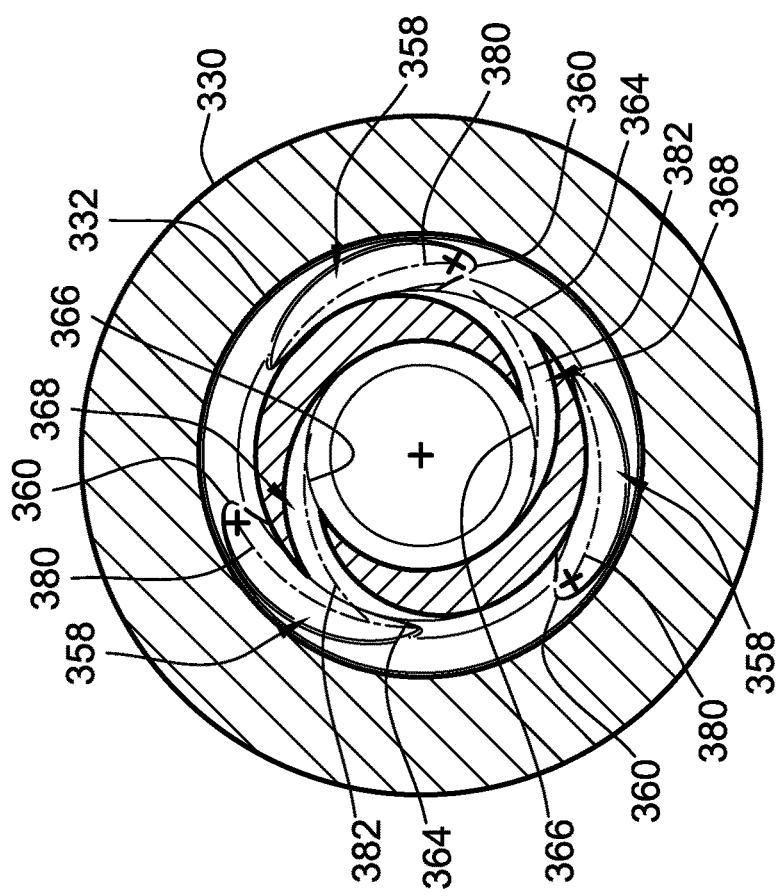
FIGS. 16-17 are cross sections of the tip of FIG. 14, taken in planes which are normal to the plane of the cross section shown in FIG. 15.

With reference to FIG. 17, the same illustrates a cross section taken in a plane through which swirl chamber passages 368 extend. As may be seen in this view, each swirl chamber passage 368 defines a longitudinal axis 382 which extends only in the radial direction, i.e. it only includes a radial direction component, unlike longitudinal axes 380 which include both a radial and axial direction component.

These features allow for imparting a significant tangential component to the flow velocity of fuel through tip 320.

The particular swirl chamber passages 368 shown in FIG. 14 are curved unlike the straight passages shown relative to swirl chamber passages 58, 158, 258 described above. This geometry is achieved by forming swirl chamber passages 368 via additive manufacturing, unlike machined swirl chamber passages 58, 158, 258. The applicant has found that such curved passages allow for a significant increase in the flow velocity within swirl chamber 370.

Figure 18:
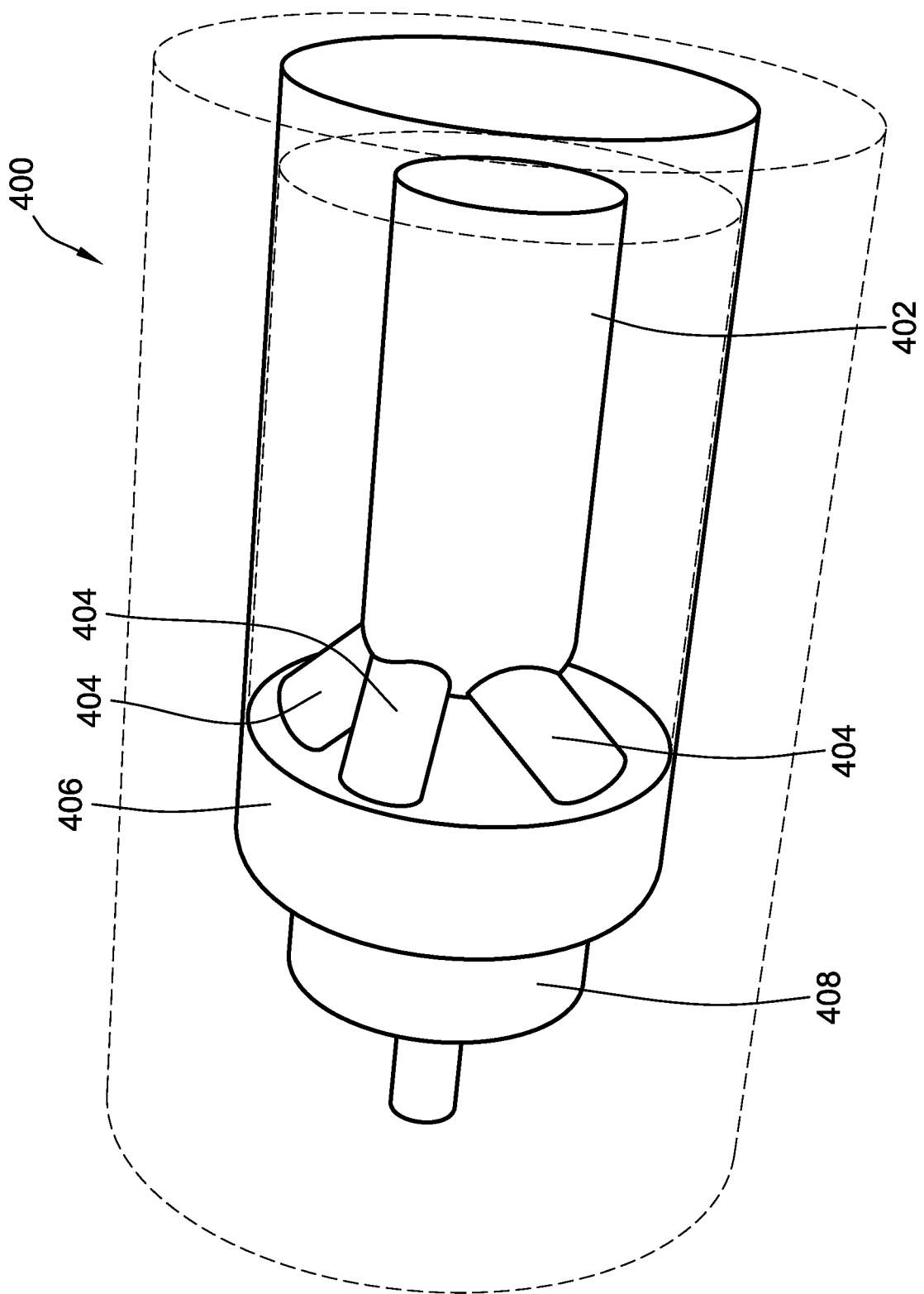
FIG. 18 is representation of a flow volume defined by the embodiment of FIGS. 1-5.

FIG. 18 is a schematic view of a flow volume of the embodiment of FIGS. 1-5 described above. Portion 402 shows the flow through internal cavity 56. Portions 404 illustrate the flow through pre-swirl passages 58. The straight path having both radial and axial directional components of pre-swirl passages 58 is readily apparent in this view at portions 404. Portion 406 represents the flow through feed annulus 62, and portion 408 represents the flow through swirl chamber 70.

Figure 19:
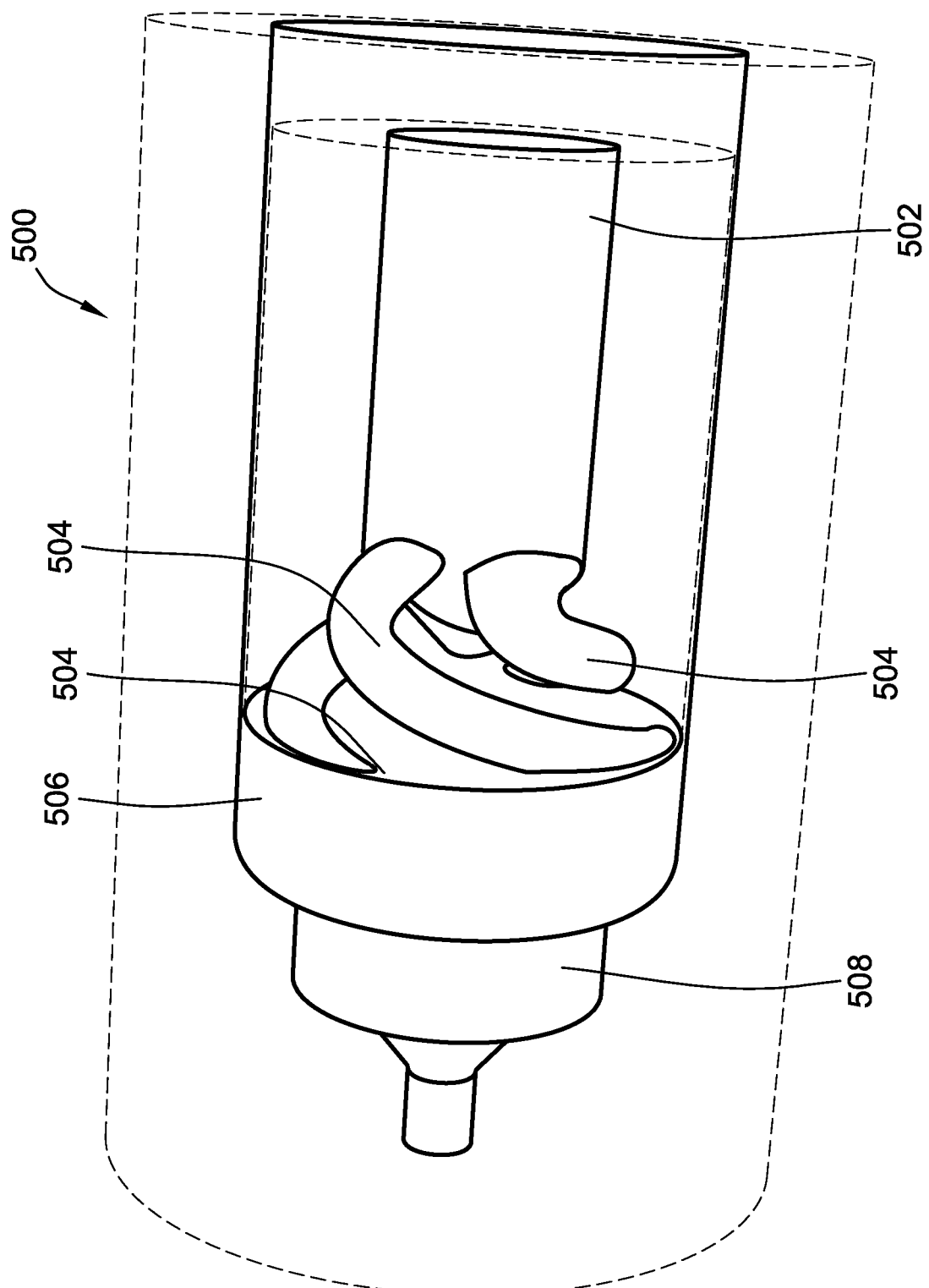
FIG. 19 is a representation of a flow volume defined by the embodiment of FIGS. 6-9.

FIG. 19 is a schematic view of a flow volume of the embodiment of FIGS. 6-9 described above. Portion 502 shows the flow through internal cavity 156. Portions 504 illustrate the flow through pre-swirl passages 158. The tapered helical path having both radial and axial directional components of pre-swirl passages 158 is readily apparent in this view at portions 504. Portion 506 represents the flow through feed annulus 162, and portion 408 represents the flow through swirl chamber 170.

Figure 20:
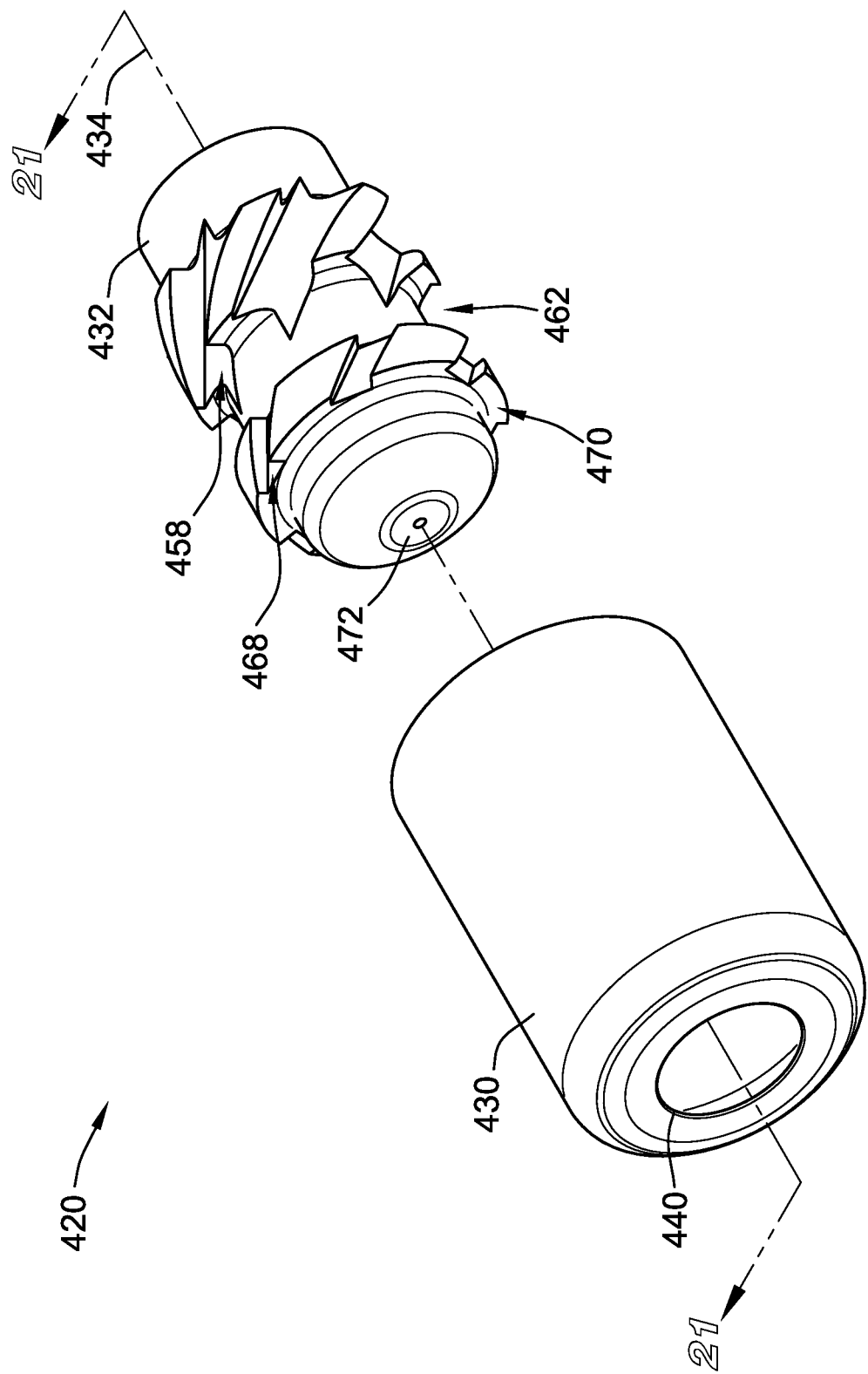
FIG. 20 is a perspective exploded view of another embodiment of a pre-swirl pressure atomizing tip.

FIG. 20 is an exploded view of another embodiment of at tip 420 according to the teachings herein. Similar to the embodiments above, tip 420 includes a tip body 430 and a swirler 432 inserted in tip body 430. Tip body 430 includes an orifice 440 as shown. Swirler 432 is inserted in tip body 430 in such a way such that a feed annulus 462 and a swirl chamber 470 are formed between tip body 430 and swirler 432. A plurality of pre-swirl passages 458 convey fuel from an inlet chamber 456 (see FIG. 21) or region into the feed annulus 462. The pre-swirl passages 458 are arranged in a helical configuration. It is this helical configuration that allows for the introduction of a tangential component to the flow velocity of the fuel as it enters feed annulus 462.

Figure 21:
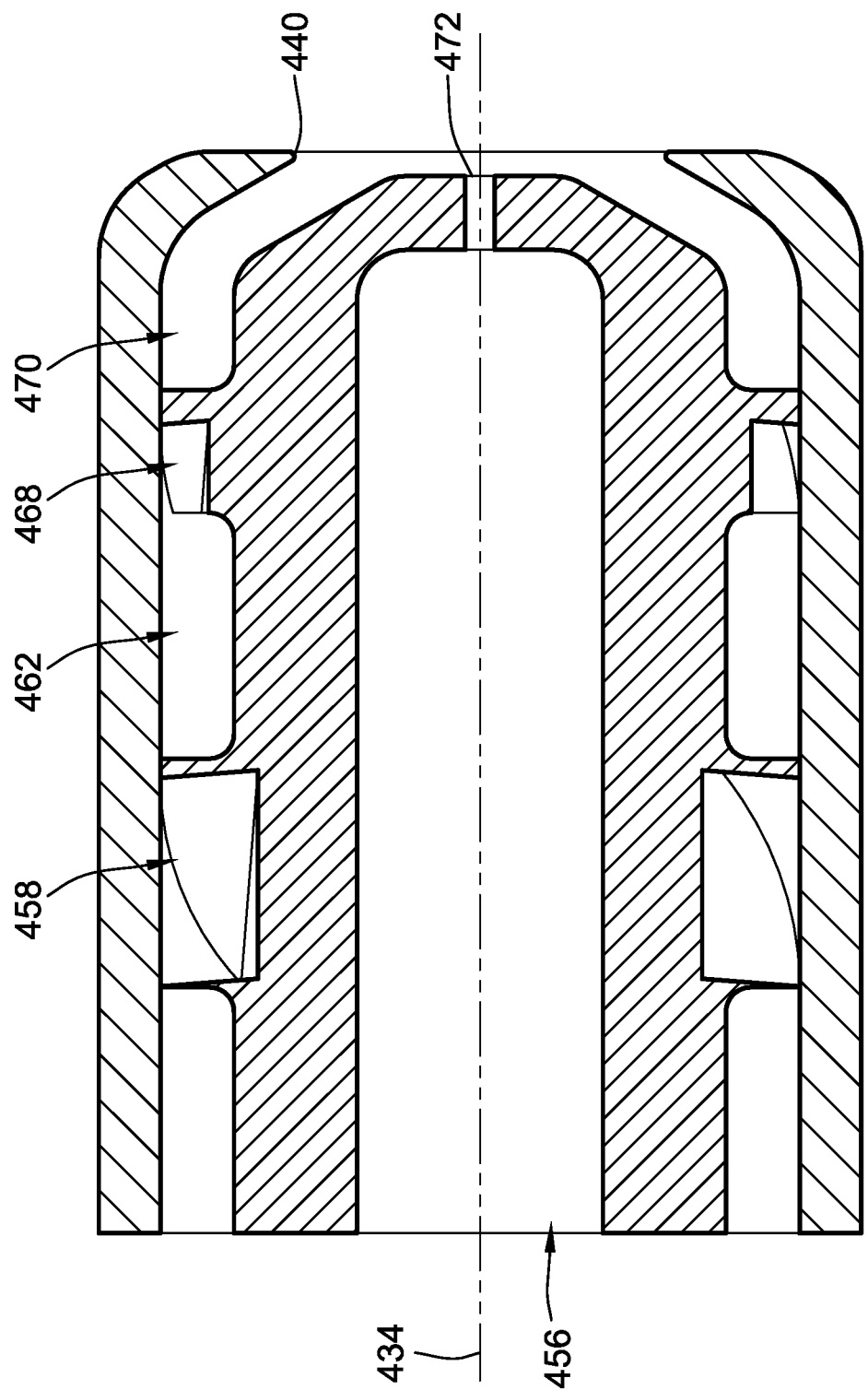
FIG. 21 is a cross section the tip of FIG. 20.

With reference to FIG. 21, fuel then exits feed annulus 462 via swirl chamber passages 468 and is conveyed to swirl chamber 470. Swirl chamber passages 470 are also arranged in a helical configuration to maintain or increase the tangential component of the fuel velocity as it enters swirl chamber 470. This fuel may then exit orifice 440 as may be surmised from FIG. 21. Additionally, a small orifice 427 is also in communication with inlet chamber 456 and also serves as a fuel outlet.

Figure 22:
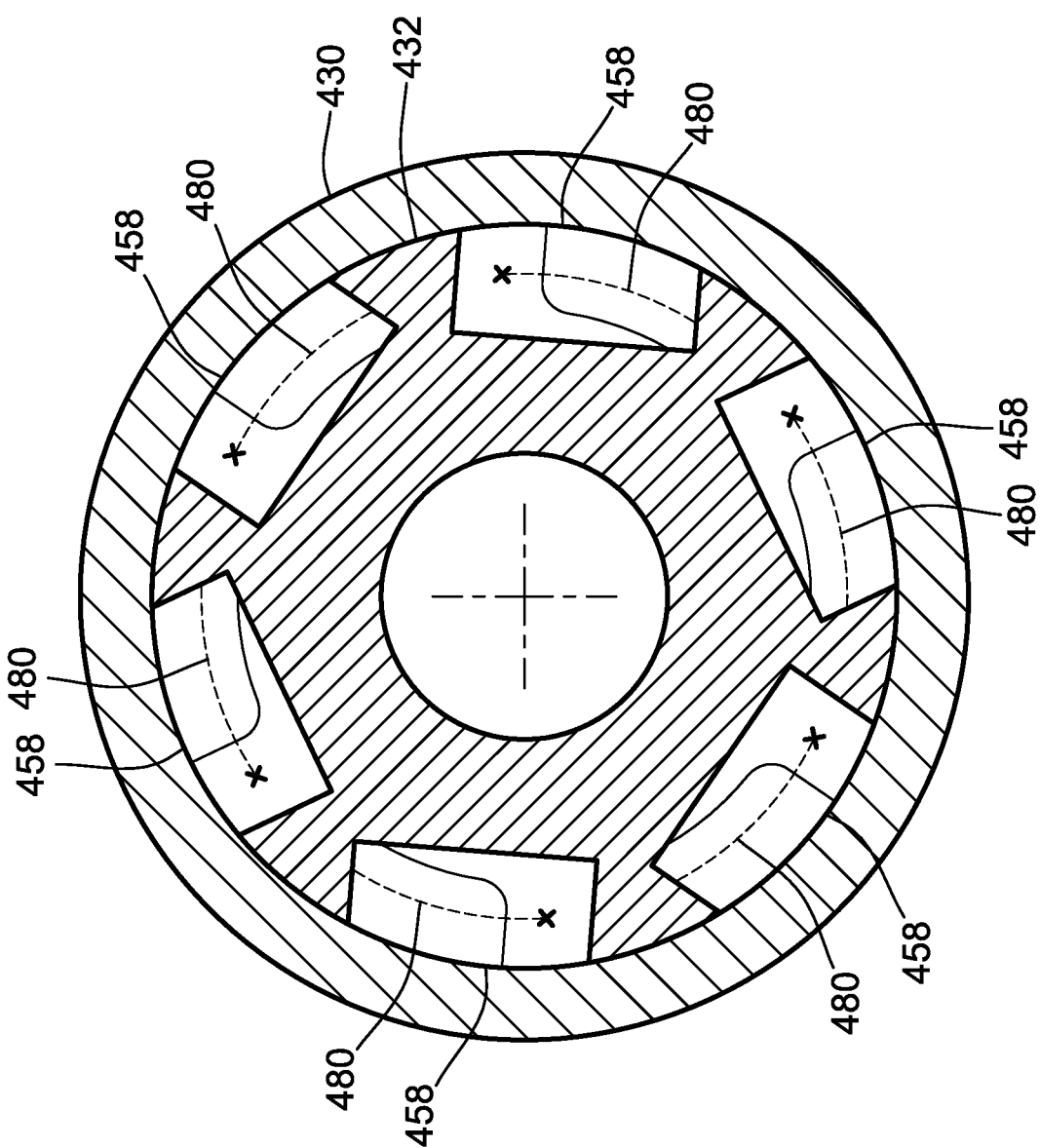
FIGS. 22-23 are cross sections of the tip of FIG. 20, taken in planes which are normal to the plane of the cross section shown in FIG. 21.
Figure 23:
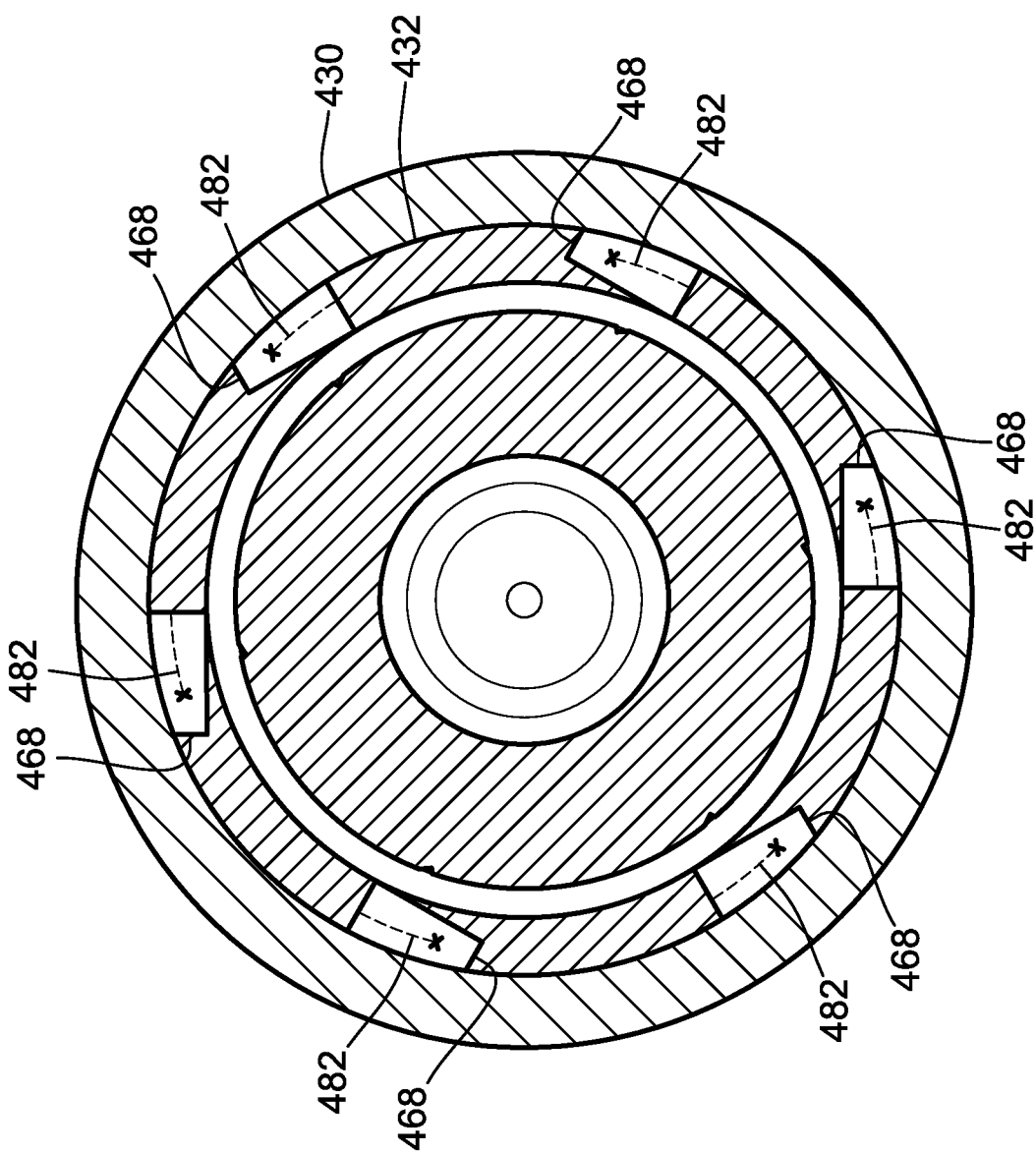

FIG. 22 is a cross section taken through pre-swirl passages 458. Helical path of each flow passage's axis 480 is shown in this view. A similar configuration is illustrated in FIG. 23 relative to swirl chamber passages 468 and their respective helical axes 482. Just as was the case with the embodiments above, all or a portion of tip 420 may be manufactured by additive manufacturing. It should also be noted that although passages 458, 468, are shown as slotted passages, they could also be formed as fully enclosed passages having a variety of cross sectional geometries. Indeed, the use of additive manufacturing allows for the possibility of a variety of flow passage geometries.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A tip for a nozzle of a fuel injector, the tip comprising:
a tip body, the tip body defining a longitudinal axis of the tip;
a swirler, situated within the tip body, wherein the swirler includes a plurality of pre-swirl passages, wherein each one of the plurality of pre-swirl passages has a longitudinal axis which extends in both a radial and axial direction relative to the longitudinal axis of the tip;
a feed annulus, wherein the feed annulus receives a flow of fuel from the plurality of pre-swirl passages, wherein the plurality of pre-swirl passages are configured and arranged such that the flow of fuel entering the feed annulus has a flow velocity having a tangential component;
wherein the swirler includes a plurality of swirl chamber passages, the plurality of swirl chamber passages receiving the flow of fuel from the feed annulus, wherein each one of the plurality of swirl chamber passages includes a longitudinal axis which extends from the feed annulus to a swirl chamber in only the radial direction relative to the longitudinal axis of the tip; and
wherein the swirler includes the swirl chamber, the swirl chamber receiving the flow of fuel from the feed annulus via the plurality of swirl chamber passages.

2. The tip of claim 1, wherein the feed annulus is formed between an interior radially facing surface of the tip body and an exterior radially facing surface of the swirler.

3. The tip of claim 1, wherein the feed annulus is radially outside of the swirl chamber relative to the longitudinal axis of the tip.

4. The tip of claim 1, wherein the longitudinal axis of each of the plurality pre-swirl passages extends along a tapered helical path.

5. The tip of claim 1, wherein the longitudinal axis of each of the plurality of pre-swirl passages extends along a straight path.

6. The tip of claim 1, wherein the longitudinal axis of each of the plurality of swirl chamber passages is straight.

7. The tip of claim 1, wherein the longitudinal axis of each of the plurality of swirl chamber passages is curved.

8. The tip of claim 1, wherein at least a portion of the swirler is formed by additive manufacturing.

9. A tip for a nozzle of a fuel injector, the tip comprising:
a tip body;
a swirler contained within the tip body, wherein the swirler includes an inlet cavity for receiving a flow of fuel entering the tip body;
a feed annulus in fluid communication with the inlet cavity and downstream from the inlet cavity relative to a direction of fuel flow through the tip;
a swirl chamber in fluid communication with the feed annulus and downstream from the feed annulus relative to the direction of fuel flow through the tip;
wherein the feed annulus is formed between an interior radially facing surface of the tip body and an exterior radially facing surface of the swirler; and
wherein the feed annulus is at least one of axially upstream or radially outside of the swirl chamber relative to a longitudinal axis of the tip;
wherein the feed annulus and the swirl chamber are in fluid communication via a plurality of swirl chamber passages, wherein each one of the plurality of swirl chamber passages includes a longitudinal axis which extends from the feed annulus to the swirl chamber in only the radial direction relative to a longitudinal axis defined by the tip.

10. The tip of claim 9, wherein the inlet cavity and feed annulus are in fluid communication via a plurality of pre-swirl passages, wherein each one of the plurality of pre-swirl passages has a longitudinal axis which extends in both a radial and axial direction relative to a longitudinal axis defined by the tip.

11. The tip of claim 10, wherein the longitudinal axis of each of the plurality pre-swirl passages extends along one of a tapered helical path or a straight path.

12. The tip of claim 9, wherein the longitudinal axis of each one of the swirl chamber passages extends along one of a straight or a curved path.

13. The tip of claim 9, wherein the plurality of pre-swirl passages are configured and arranged such that the flow of fuel entering the feed annulus has a flow velocity having a tangential component.

14. A method of forming a tip for a nozzle of a fuel injector, the method comprising:
providing a swirler;
providing a tip body;
inserting the swirler into a passage of the tip body, the swirler having a plurality of pre-swirl passages and a plurality of swirl chamber passages;
fixing the swirler within the passage of the tip body such that a feed annulus is formed between a radially interior facing surface of the tip body and a radially exterior facing surface of the swirler to place the plurality of pre-swirl passages in fluid communication with the plurality of swirl chamber passages;
wherein each one of the plurality of swirl chamber passages include a longitudinal axis which extends from the feed annulus to a swirl chamber in only the radial direction relative to a longitudinal axis defined by the tip.

15. The method of claim 14, wherein the step of providing the swirler includes manufacturing at least a portion of the swirler by additive manufacturing.

16. The method of claim 15, wherein the step of manufacturing at least a portion of the swirler by additive manufacturing includes forming the pre-swirl passages by additive manufacturing.

17. The method of claim 16, wherein the step of forming the pre-swirl passages by additive manufacturing includes forming the pre-swirl passages such that each one of the pre-swirl passages includes a longitudinal axis which moves along one of a tapered helical path or a straight path.

18. The method of claim 15, wherein the step of manufacturing at least a portion of the swirler by additive manufacturing includes forming the swirl chamber passages by additive manufacturing.

19. The method of claim 18, wherein the step of forming the swirl chamber passages by additive manufacturing includes forming the swirl chamber passages such that each one of the swirl chamber passages has a longitudinal axis which moves along one of a straight path or a curved path.

* * * * *